(12) United States Patent
Nakata et al.

(10) Patent No.: US 12,498,645 B2
(45) Date of Patent: Dec. 16, 2025

(54) ELECTROPHOTOGRAPHIC PHOTOSENSITIVE MEMBER, AND ELECTROPHOTOGRAPHIC APPARATUS AND PROCESS CARTRIDGE EACH INCLUDING THE ELECTROPHOTOGRAPHIC PHOTOSENSITIVE MEMBER

(71) Applicant: CANON KABUSHIKI KAISHA, Tokyo (JP)

(72) Inventors: Koichi Nakata, Tokyo (JP); Naohiro Takahashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 626 days.

(21) Appl. No.: 18/047,300

(22) Filed: Oct. 18, 2022

(65) Prior Publication Data

US 2023/0143174 A1   May 11, 2023

(30) Foreign Application Priority Data

Oct. 29, 2021 (JP) .................. 2021-177593

(51) Int. Cl.
*C08F 220/34* (2006.01)
*C09D 133/14* (2006.01)
(Continued)

(52) U.S. Cl.
CPC ......... *G03G 5/0732* (2020.05); *C08F 220/34* (2013.01); *C09D 133/14* (2013.01); *G03G 5/047* (2013.01); *G03G 21/1814* (2013.01)

(58) Field of Classification Search
CPC .. G03G 5/0732; G03G 21/1814; G03G 5/047; C09D 133/14
See application file for complete search history.

(56) References Cited

U.S. PATENT DOCUMENTS

| | | |
|---|---|---|
| 7,186,489 B2 | 3/2007 | Uematsu |
| 7,226,711 B2 | 6/2007 | Amamiya |

(Continued)

FOREIGN PATENT DOCUMENTS

| | | |
|---|---|---|
| JP | 2018-101136 A | 6/2018 |
| JP | 2019-211544 A | 12/2019 |

(Continued)

*Primary Examiner* — Mark F. Huff
*Assistant Examiner* — Charles Collins Sullivan, IV
(74) *Attorney, Agent, or Firm* — VENABLE LLP

(57) ABSTRACT

Provided is an electrophotographic photosensitive member including a support, a charge-generating layer, a first hole-transporting layer, and a second hole-transporting layer, wherein the second hole-transporting layer contains a hole-transportable compound represented by the formula (1) (mass: W1, energy value of the highest occupied molecular orbital: CTM1HOMO), and a hole-transportable compound represented by the formula (2) (mass: W2) and/or a hole-transportable compound represented by the formula (3) (mass: W3) (energy value of the highest occupied molecular orbital: CTM2HOMO), wherein a value calculated from the expression (I) is from 0.05% by mass to 5.0% by mass, and wherein the expression (II) is satisfied: $(W2+W3)/(W1+W2+W3)\times100$ (% by mass) ... Expression (I); and $0.05\ (eV) \leq |CTM2HOMO| - |CTM1HOMO| \leq 0.30\ (eV)$ ... (II).

11 Claims, 6 Drawing Sheets

(51) Int. Cl.
    *G03G 5/047*    (2006.01)
    *G03G 5/07*     (2006.01)
    *G03G 21/18*    (2006.01)

(56) References Cited

U.S. PATENT DOCUMENTS

| | | |
|---|---|---|
| 7,534,534 B2 | 5/2009 | Nakata |
| 9,316,931 B2 | 4/2016 | Takagi |
| 9,389,523 B2 | 7/2016 | Nakata |
| 9,594,318 B2 | 3/2017 | Nakata |
| 9,740,117 B2 | 8/2017 | Kosaka |
| 10,042,272 B2 | 8/2018 | Mori |
| 10,120,331 B2 | 11/2018 | Nakata |
| 10,310,395 B2 | 6/2019 | Nakata |
| 10,451,984 B2 | 10/2019 | Mori |
| 10,488,769 B2 | 11/2019 | Nakata |
| 10,488,771 B2 | 11/2019 | Mori |
| 10,558,132 B2 | 2/2020 | Ishiduka |
| 10,558,133 B2 | 2/2020 | Nakamura |
| 10,670,979 B2 | 6/2020 | Nakata |
| 10,761,442 B2 | 9/2020 | Nakata |
| 10,768,539 B2 | 9/2020 | Mori |
| 10,831,118 B2 | 11/2020 | Watanabe |
| 10,969,703 B2 | 4/2021 | Takeuchi |
| 10,976,677 B2 | 4/2021 | Tokimitsu |
| 11,029,615 B2 | 6/2021 | Mitsui |
| 11,029,616 B2 | 6/2021 | Kujirai |
| 11,169,453 B2 | 11/2021 | Takeuchi |
| 11,204,560 B2 | 12/2021 | Tokimitsu |
| 11,237,494 B2 | 2/2022 | Mori |
| 2011/0318677 A1* | 12/2011 | Doi .................... G03G 5/1476 |
| | | 430/58.75 |
| 2018/0173121 A1 | 6/2018 | Noguchi |
| 2019/0025719 A1* | 1/2019 | Yamazaki .......... G03G 5/06147 |
| 2019/0369515 A1* | 12/2019 | Nishida .............. G03G 5/14734 |
| 2020/0249590 A1 | 8/2020 | Nakata |
| 2020/0341394 A1 | 10/2020 | Ikari |
| 2021/0033992 A1 | 2/2021 | Kaku |

FOREIGN PATENT DOCUMENTS

| | | |
|---|---|---|
| JP | 2019-211545 A | 12/2019 |
| JP | 2019-211548 A | 12/2019 |
| JP | 2019-211549 A | 12/2019 |

* cited by examiner

ELECTROPHOTOGRAPHIC PHOTOSENSITIVE MEMBER, AND ELECTROPHOTOGRAPHIC APPARATUS AND PROCESS CARTRIDGE EACH INCLUDING THE ELECTROPHOTOGRAPHIC PHOTOSENSITIVE MEMBER

BACKGROUND OF THE INVENTION

Field of the Invention

The present invention relates to an electrophotographic photosensitive member, and an electrophotographic apparatus and a process cartridge each including the electrophotographic photosensitive member.

Description of the Related Art

The surface layer of an electrophotographic photosensitive member is required to have durability and stability because a stress caused by a series of electrophotographic processes including charging, exposure, development, transfer, and cleaning is repeatedly applied to the surface layer. Means for improving the durability is, for example, a method involving incorporating a curable resin into the surface layer of the electrophotographic photosensitive member. However, the arrangement of a surface layer having high durability involves a problem in that the following so-called ghost phenomenon may worsen: a potential difference between an exposed portion and an unexposed portion at the time of the last image output has an influence on the next image output, and the influence appears as an image density difference. Measures against the problem have typically been taken by providing an electricity-eliminating step of performing photoirradiation or the like after the completion of each cycle of the electrophotographic process.

Meanwhile, in recent years, there have been growing demands for the simplification of the process of an electrophotographic apparatus and a reduction in cost thereof, and hence a design in which an existing module or the like may be omitted has been required. Accordingly, there has been required an electrophotographic photosensitive member in which a ghost image can be suppressed even when no electricity-eliminating step is provided.

In Japanese Patent Application Laid-Open No. 2018-101136, there is a description that the ghost phenomenon is suppressed by making a contrivance on the material configuration of the surface layer of an electrophotographic photosensitive member. However, the configuration does not correspond to a high-durability electrophotographic photosensitive member whose surface layer has incorporated thereinto a curable resin.

In recent years, not only an improvement in durability of an electrophotographic photosensitive member but also a technology by which an image defect can be suppressed even in a simplified process has been required.

An object of the present invention is to provide an electrophotographic photosensitive member, which has a ghost phenomenon-suppressing effect despite being highly durable, and has satisfactory electrical characteristics, and an electrophotographic apparatus and a process cartridge each including the electrophotographic photosensitive member.

SUMMARY OF THE INVENTION

That is, according to one aspect of the present invention, there is provided an electrophotographic photosensitive member including: a support; a charge-generating layer formed on the support; a first hole-transporting layer formed on the charge-generating layer; and a second hole-transporting layer formed on the first hole-transporting layer, the second hole-transporting layer being a surface layer, wherein the second hole-transporting layer contains a copolymer of a composition containing a hole-transportable compound represented by the following formula (1), and at least one kind of hole-transportable compound selected from the group consisting of: a hole-transportable compound represented by the following formula (2); and a hole-transportable compound represented by the following formula (3), wherein when a mass of the hole-transportable compound represented by the following formula (1) that the composition contains is represented by W1, a mass of the hole-transportable compound represented by the following formula (2) that the composition contains is represented by W2, and a mass of the hole-transportable compound represented by the following formula (3) that the composition contains is represented by W3, a value calculated from the following expression (I) is from 0.05% by mass to 5.0% by mass:

$$(W2+W3)/(W1+W2+W3) \times 100 \text{ (\% by mass)} \qquad \text{Expression (I),}$$

and wherein when an energy value of a highest occupied molecular orbital of the hole-transportable compound represented by the following formula (1) obtained as a result of energy calculation of the hole-transportable compound after structure optimization thereof by a density functional theory B3LYP/6-31G* is represented by CTM1HOMO, and an energy value of a highest occupied molecular orbital of the at least one kind of hole-transportable compound selected from the group consisting of: the hole-transportable compound represented by the following formula (2); and the hole-transportable compound represented by the following formula (3) obtained as a result of energy calculation of the hole-transportable compound after structure optimization thereof by the density functional theory B3LYP/6-31G* is represented by CTM2HOMO, the CTM1HOMO and the CTM2HOMO satisfy the following expression (II):

$$0.05 \text{ (eV)} \leq |CTM2HOMO| - |CTM1HOMO| \leq 0.30 \text{ (eV)} \qquad \text{(II)}$$

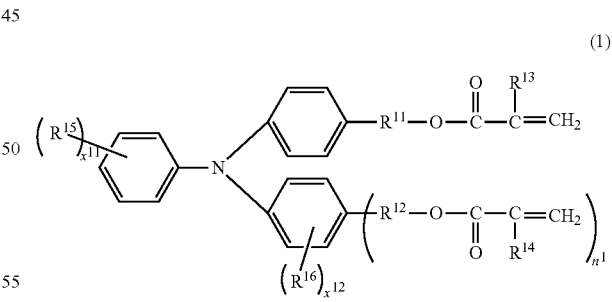

(1)

in the formula (1), $R^{11}$ and $R^{12}$ each independently represent an alkylene group having 2 to 5 carbon atoms, $R^{13}$ and $R^{14}$ each independently represent a hydrogen atom or a methyl group, $n^1$ represents 0 or 1, $R^{15}$ represents an alkyl group having 1 to 4 carbon atoms, an alkoxy group having 1 to 4 carbon atoms, or a substituted or unsubstituted phenyl group, $x^{11}$ represents an integer of from 0 to 5, and when $x^{11}$ represents an integer of from 2 to 5, $x^{11}$ $R^{15}$s may be identical to or different from each other, $R^{16}$ represents an alkyl group having 1 to 4 carbon atoms, or an alkoxy group having 1 to 4 carbon atoms, and $x^{12}$ represents an integer of from 0 to 4, and when $x^{12}$ represents an integer of from 2 to 4, $x^{12}$ $R^{16}$s may be identical to or different from each other;

(2)

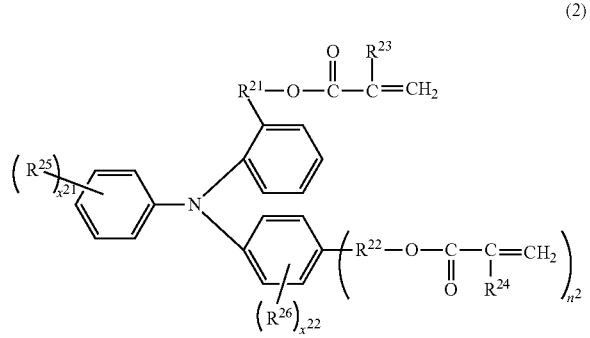

in the formula (2), $R^{21}$ and $R^{22}$ each independently represent an alkylene group having 2 to 5 carbon atoms, $R^{23}$ and $R^{24}$ each independently represent a hydrogen atom or a methyl group, $n^2$ represents 0 or 1, $R^{25}$ represents an alkyl group having 1 to 4 carbon atoms, an alkoxy group having 1 to 4 carbon atoms, or a substituted or unsubstituted phenyl group, $x^{21}$ represents an integer of from 0 to 5, and when $x^{21}$ represents an integer of from 2 to 5, $x^{21}$ $R^{25}$s may be identical to or different from each other, $R^{26}$ represents an alkyl group having 1 to 4 carbon atoms, or an alkoxy group having 1 to 4 carbon atoms, and $x^{22}$ represents an integer of from 0 to 4, and when $x^{22}$ represents an integer of from 2 to 4, $x^{22}$ $R^{26}$s may be identical to or different from each other;

(3)

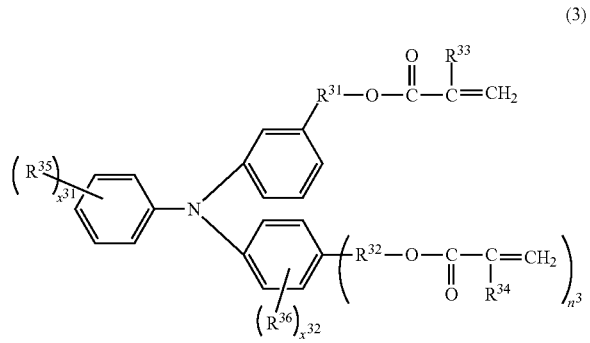

in the formula (3), $R^{31}$ and $R^{32}$ each independently represent an alkylene group having 2 to 5 carbon atoms, $R^{33}$ and $R^{34}$ each independently represent a hydrogen atom or a methyl group, $n^3$ represents 0 or 1, $R^{35}$ represents an alkyl group having 1 to 4 carbon atoms, an alkoxy group having 1 to 4 carbon atoms, or a substituted or unsubstituted phenyl group, $x^{31}$ represents an integer of from 0 to 5, and when $x^{31}$ represents an integer of from 2 to 5, $x^{31}$ $R^{35}$s may be identical to or different from each other, $R^{36}$ represents an alkyl group having 1 to 4 carbon atoms, or an alkoxy group having 1 to 4 carbon atoms, and $x^{32}$ represents an integer of from 0 to 4, and when $x^{32}$ represents an integer of from 2 to 4, $x^{32}$ $R^{36}$s may be identical to or different from each other;

Further features of the present invention will become apparent from the following description of exemplary embodiments with reference to the attached drawings.

DESCRIPTION OF THE EMBODIMENTS

Figure 1:
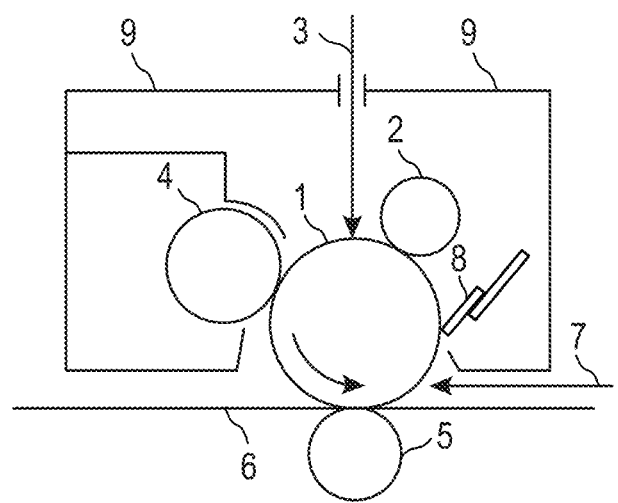
FIG. 1 is a schematic view for illustrating an example of a process cartridge including an electrophotographic photosensitive member.

A mode for carrying out the present invention is described below with reference to the drawings, but the scope of the present disclosure is not limited only to the mode, and the mode modified to the extent that the gist of the present disclosure is not impaired is also included in the present invention.

The present invention is applied to a case in which the surface layer of an electrophotographic photosensitive member is a surface layer containing a hole-transportable compound having a chain polymerizable functional group. To improve the durability of the electrophotographic photosensitive member, the use of a surface layer having a high degree of crosslinked structure as the surface layer has been required. Further, recently, to simplify an electrophotographic apparatus, the curtailment and simplification of various processes have been required.

In an electrophotographic photosensitive member having a crosslinked structure in its surface layer, an interface is formed between the surface layer and a layer below the layer. Accordingly, there is a problem in that interlayer charge transport is not completely performed, and hence a ghost image occurs. The problem is typically alleviated as follows: an electricity-eliminating step is provided for the photosensitive member after the completion of an electrophotographic process to remove a potential difference on the photosensitive member once. The electricity-eliminating step is typically performed by irradiating the photosensitive member with electricity-eliminating light that performs uniform exposure on its entire surface.

As described above, along with a recent request for process simplification, there has been required the following electrophotographic photosensitive member: while the photosensitive member has high durability, the occurrence of a ghost phenomenon can be suppressed even when an electricity-eliminating process is omitted.

The inventors of the present invention have made extensive investigations, and as a result, have found that such problem can be alleviated by incorporating, at a specific ratio, a similar hole-transportable compound a specific physical property value of which differs from that of a main hole-transportable compound having a chain polymerizable functional group.

Specifically, in the present invention, in an electrophotographic photosensitive member including: a support; a charge-generating layer formed on the support; a first hole-transporting layer formed on the charge-generating layer; and a second hole-transporting layer formed on the first hole-transporting layer, the second hole-transporting layer being a surface layer, the second hole-transporting layer contains a copolymer of a composition containing a hole-transportable compound represented by the following formula (1), and at least one kind of hole-transportable compound selected from the group consisting of: a hole-transportable compound represented by the following formula (2); and a hole-transportable compound represented by the following formula (3).

When a mass of the hole-transportable compound represented by the following formula (1) that the composition contains is represented by W1, a mass of the hole-transportable compound represented by the following formula (2) that the composition contains is represented by W2, and a mass of the hole-transportable compound represented by the following formula (3) that the composition contains is represented by W3, a value calculated from the following expression (I) is from 0.05% by mass to 5.0% by mass:

$(W2+W3)/(W1+W2+W3) \times 100$ (% by mass)  Expression (I), and wherein when an energy value of the highest occupied molecular orbital of the hole-transportable compound represented by the following formula (1) is represented by CTM1HOMO, and an energy value of the highest occupied molecular orbital of the at least one kind of hole-transportable compound selected from the group consisting of: the hole-transportable compound represented by the following formula (2); and the hole-transportable compound represented by the following formula (3) is represented by CTM2HOMO, the CTM1HOMO and the CTM2HOMO satisfy the following expression (II).

$0.05$ (eV)$\leq$|CTM2HOMO|−|CTM1HOMO|$\leq 0.30$ (eV)  (II)

The energy value of the highest occupied molecular orbital of each of the hole-transportable compounds represented by the general formulae (1) to (3) is obtained as a result of the energy calculation thereof after its structure optimization by a density functional theory B3LYP/6-31G*.

As described later, the CTM1HOMO and the CTM2HOMO preferably satisfy the following expression (II)'.

$0.15$ (eV)$\leq$|CTM2HOMO|−|CTM1HOMO|$\leq 0.25$ (eV)  (II)'

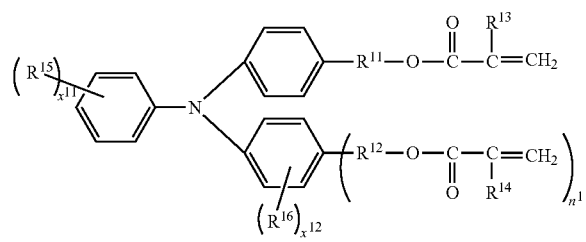

(1)

In the formula (1), $R^{11}$ and $R^{12}$ each independently represent an alkylene group having 2 to 6 carbon atoms, $R^{13}$ and $R^{14}$ each independently represent a hydrogen atom or a methyl group, $n^1$ represents 0 or 1, $R^{15}$ represents an alkyl group having 1 to 4 carbon atoms, an alkoxy group having 1 to 4 carbon atoms, or a substituted or unsubstituted phenyl group, $x^{11}$ represents an integer of from 0 to 5, and when $x^{11}$ represents an integer of from 2 to 5, $x^{11}$ $R^{15}$s may be identical to or different from each other, $R^{16}$ represents an alkyl group having 1 to 4 carbon atoms, or an alkoxy group having 1 to 4 carbon atoms, and $x^{12}$ represents an integer of from 0 to 4, and when $x^{12}$ represents an integer of from 2 to 4, $x^{12}$ $R^{16}$s may be identical to or different from each other.

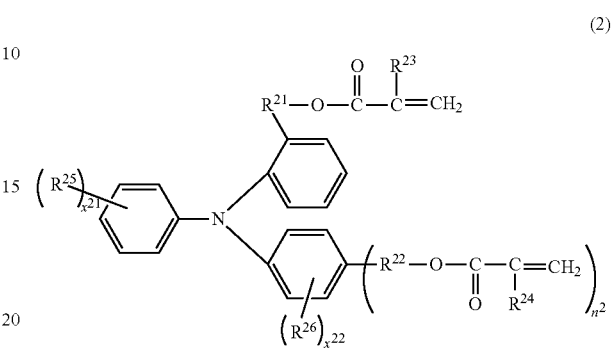

(2)

In the formula (2), $R^{21}$ and $R^{22}$ each independently represent an alkylene group having 2 to 6 carbon atoms, $R^{23}$ and $R^{24}$ each independently represent a hydrogen atom or a methyl group, $n^2$ represents 0 or 1, $R^{25}$ represents an alkyl group having 1 to 4 carbon atoms, an alkoxy group having 1 to 4 carbon atoms, or a substituted or unsubstituted phenyl group, $x^{21}$ represents an integer of from 0 to 5, and when $x^{21}$ represents an integer of from 2 to 5, $x^{21}$ $R^{25}$s may be identical to or different from each other, $R^{26}$ represents an alkyl group having 1 to 4 carbon atoms, or an alkoxy group having 1 to 4 carbon atoms, and $x^{22}$ represents an integer of from 0 to 4, and when $x^{22}$ represents an integer of from 2 to 4, $x^{22}$ $R^{26}$s may be identical to or different from each other.

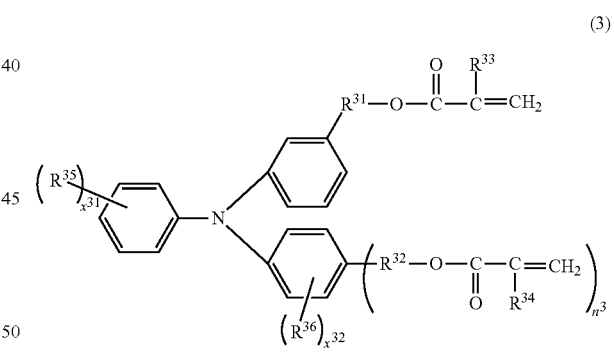

(3)

In the formula (3), $R^{31}$ and $R^{32}$ each independently represent an alkylene group having 2 to 6 carbon atoms, $R^{33}$ and $R^{34}$ each independently represent a hydrogen atom or a methyl group, $n^3$ represents 0 or 1, $R^{35}$ represents an alkyl group having 1 to 4 carbon atoms, an alkoxy group having 1 to 4 carbon atoms, or a substituted or unsubstituted phenyl group, $x^{31}$ represents an integer of from 0 to 5, and when $x^{31}$ represents an integer of from 2 to 5, $x^{31}$ $R^{35}$s may be identical to or different from each other, $R^{36}$ represents an alkyl group having 1 to 4 carbon atoms, or an alkoxy group having 1 to 4 carbon atoms, and $x^{32}$ represents an integer of from 0 to 4, and when $x^{32}$ represents an integer of from 2 to 4, $x^{32}$ $R^{36}$s may be identical to or different from each other.

A ghost phenomenon, which occurs when no electricity-eliminating step is provided, is caused as follows: when, in a series of processes including exposure, development, and transfer, a difference in surface potential of the electrophotographic photosensitive member, which has been caused between its exposed portion and unexposed portion by the last process, is carried over to the next process, the difference is output as image density unevenness at the time of the next image output to cause the phenomenon.

The effect of the present invention may be expressed when the hole-transportable compounds present only on the surface layer side of the electrophotographic photosensitive member contain, at a moderate ratio, a substance whose highest occupied molecular orbital (HOMO) has an energy value slightly higher than that of a main hole-transportable compound like the present invention.

Although an accurate mechanism for the suppression of a ghost image has not been elucidated, the inventors have conceived the mechanism to be as described below. When any other hole-transportable compound whose hole transport level is an energy value slightly higher than that of the main hole-transportable compound to be incorporated into the surface layer is incorporated, moderate delay of hole transfer occurs in the second hole-transporting layer to homogenize a density difference due to potential unevenness at the time of development.

The inventors have conceived that the combination of the main hole-transportable compound and a positional isomer thereof, which has the same main skeleton structure as that of the compound but differs from the compound in substitution position of a substituent, is optimum because the isomer has satisfactory compatibility with, and a satisfactory affinity for, the compound.

The energy value of the highest occupied molecular orbital of each of the hole-transportable compounds may be calculated by a calculation method such as a molecular orbital calculation based on a chemical structure. An application to be used in the calculation may be, for example, computational chemistry software, such as GAUSSIAN 16 manufactured by Gaussian, Inc., or SPARTAN'16 manufactured by Wavefunction, Inc.

A numerical value may be determined by: inputting the structure of a compound whose energy value is to be calculated; optimizing the structure through use of a semiempirical molecular orbital method or the like; and calculating the energy through use of a density functional theory.

A difference in energy value of the highest occupied molecular orbital between the main hole-transportable compound and the other hole-transportable compound preferably falls within the range of from 0.05 (eV) to 0.30 (eV), and more preferably falls within the range of from 0.15 (eV) to 0.25 (eV). When the difference is excessively small, the effect of the present invention becomes smaller, and when the difference is excessively large, there is a tendency in that the hole transportability of the second hole-transporting layer is reduced, and hence, for example, a fluctuation in potential of the photosensitive member reduces.

The configuration of the present invention in the second hole-transporting layer can alleviate a ghost phenomenon. In the configuration of the second hole-transporting layer of the present invention, the addition amount of the hole-transportable compounds represented by the formula (2) and the formula (3) is preferably from 0.05% by mass to 5.0% by mass, more preferably from 0.1% by mass to 2.0% by mass, still more preferably from 0.2% by mass to 1.0% by mass. When the addition amount is excessively small, the effect of the present invention is hardly expressed. Meanwhile, when the charge-transportable compounds having different hole transport levels are added in an excessively large amount, another detrimental effect may occur. When the amount of the substances having different charge transport levels is increased, there occurs a problem in that the charge transportability of the second hole-transporting layer is impaired to reduce a fluctuation in potential of the photosensitive member at the time of its endurance use. In general, when the amount is more than 5% by mass, a fluctuation in potential thereof under a low-humidity environment reduces.

The term "polymerizable functional group" as used in the present invention means the following functional group: when a reaction occurs between molecules each having the polymerizable functional group, the molecules can be bonded to each other through a covalent bond. An acryloyloxy group or a methacryloyloxy group is suitable as the chain polymerizable functional group from the viewpoint that the film strength and wear resistance of the surface layer of the electrophotographic photosensitive member can be improved.

A method involving applying energy, such as UV light, an electron beam, or heat, or a method involving causing an auxiliary agent such as a polymerization initiator, and a compound, such as an acid, an alkali, or a complex, to coexist may be used as a method of subjecting the chain polymerizable functional group to a polymerization reaction.

The second hole-transporting layer serving as the surface layer may be formed by: forming a coat of an application liquid for a surface layer containing the hole-transportable compounds of the present invention; and drying and/or curing the coat.

As a solvent to be used for the application liquid for a second hole-transporting layer, there may be used, for example, an alcohol-based solvent, a sulfoxide-based solvent, a ketone-based solvent, an ether-based solvent, an ester-based solvent, an aliphatic halogenated hydrocarbon-based solvent, an aliphatic hydrocarbon-based solvent, or an aromatic hydrocarbon-based solvent.

The thickness of the second hole-transporting layer is preferably 0.1 µm or more and 15 µm or less.

A method of curing the coat of the application liquid for a surface layer (polymerizing the surface layer of the present invention) is, for example, a method including polymerizing the layer with heat, light (e.g., UV light), or a radiation (e.g., an electron beam). Of those, a radiation is preferred, and out of such radiations, an electron beam is more preferred.

The polymerization is preferably performed with the electron beam because a three-dimensional network structure is obtained and hence the wear resistance is improved. In addition, the polymerization reaction is performed in a short time and efficiently, and hence productivity is also improved. An accelerator to be used when the coat is irradiated with an electron beam is, for example, a scanning-, electrocurtain-, broad beam-, pulse-, or laminar-type accelerator.

When the electron beam is used, the acceleration voltage of the electron beam is preferably 150 kV or less from the following viewpoint: the deterioration of the material characteristics due to the electron beam can be suppressed without the impairment of polymerization efficiency. In addition, an electron beam absorbed dose on the surface of the coat of the application liquid for a surface layer is preferably 1 kGy or more and 50 kGy or less, more preferably 5 kGy or more and 10 kGy or less.

In addition, when the hole-transporting substance of the present invention is polymerized with the electron beam, the following is preferred for the purpose of the suppression of the inhibitory action of oxygen on the polymerization: after having been irradiated with the electron beam in an inert gas atmosphere, the substance is heated in the inert gas atmosphere. Examples of the inert gas include nitrogen, argon, and helium.

Next, the overall configuration of the electrophotographic photosensitive member of the present invention is described.

<Electrophotographic Photosensitive Member>

A preferred configuration of the electrophotographic photosensitive member in the present invention is a configuration in which a charge-generating layer, a first hole-transporting layer, and a second hole-transporting layer are laminated in the stated order on a support. As required, an electroconductive layer or an undercoat layer may be formed between the charge-generating layer and the support. In the present invention, the charge-generating layer, the first hole-transporting layer, and the second hole-transporting layer are collectively referred to as "photosensitive layer".

<Support>

The support to be used in the present invention is preferably an electroconductive support formed of a material having electroconductivity. Examples of the material for the support include: metals and alloys, such as iron, copper, gold, silver, aluminum, zinc, titanium, lead, nickel, tin, antimony, indium, chromium, an aluminum alloy, and stainless steel. In addition, there may be used a support made of a metal or a support made of a resin having a coat formed by depositing aluminum, an aluminum alloy, an indium oxide-tin oxide alloy, or the like through vacuum deposition. In addition, there may also be used a support obtained by impregnating a plastic or paper with electroconductive particles, such as carbon black, tin oxide particles, titanium oxide particles, or silver particles, or a support containing an electroconductive resin. The shape of the support is, for example, a cylinder shape, a belt shape, a sheet shape, or a plate shape, and is most generally a cylinder shape.

The surface of the support may be subjected to cutting treatment, surface roughening treatment, alumite treatment, or the like from the viewpoints of, for example, the suppression of an interference fringe due to the scattering of laser light, the alleviation of a defect in the surface of the support, and an improvement in electroconductivity of the support.

An electroconductive layer may be formed between the support and the undercoat layer or the charge-generating layer to be described later for the purpose of the suppression of an interference fringe due to the scattering of laser or the like, resistance control, or the covering of a flaw of the support.

The electroconductive layer may be formed by: applying an application liquid for an electroconductive layer obtained by subjecting carbon black, an electroconductive pigment, an electric resistance-regulating pigment, or the like to dispersion treatment together with a binder resin; and drying the resultant coat. A compound that undergoes curing polymerization through heating, UV irradiation, radiation irradiation, or the like may be added to the application liquid for an electroconductive layer. The surface of the electroconductive layer obtained by dispersing the electroconductive pigment or the electric resistance-regulating pigment tends to be roughened.

The thickness of the electroconductive layer is preferably 0.1 μm or more and 50 μm or less, more preferably 0.5 μm or more and 40 μm or less, still more preferably 1 μm or more and 30 μm or less.

Examples of the binder resin to be used for the electroconductive layer include: a polymer and a copolymer of a vinyl compound, such as styrene, vinyl acetate, vinyl chloride, an acrylic acid ester, a methacrylic acid ester, vinylidene fluoride, or trifluoroethylene; and a polyvinyl alcohol resin, a polyvinyl acetal resin, a polycarbonate resin, a polyester resin, a polysulfone resin, a polyphenylene oxide resin, a polyurethane resin, a cellulose resin, a phenol resin, a melamine resin, a silicon resin, an epoxy resin, and an isocyanate resin.

Examples of the electroconductive pigment and the electric resistance-regulating pigment include particles of a metal (alloy), such as aluminum, zinc, copper, chromium, nickel, silver, or stainless steel, and plastic particles each having the metal deposited on its surface through vapor deposition. In addition, there may be used particles of a metal oxide, such as zinc oxide, titanium oxide, tin oxide, antimony oxide, indium oxide, bismuth oxide, tin-doped indium oxide, or antimony- or tantalum-doped tin oxide. Those pigments may be used alone or in combination thereof.

The undercoat layer (intermediate layer) may be formed between the support or the electroconductive layer and the charge-generating layer for the purposes of, for example, an improvement in adhesiveness of the charge-generating layer, an improvement in property by which a hole is injected from the support, and the protection of the charge-generating layer from an electrical breakdown.

The undercoat layer may be formed by: applying an application liquid for an undercoat layer obtained by dissolving a binder resin in a solvent; and drying the resultant coat.

Examples of the binder resin to be used for the undercoat layer include a polyvinyl alcohol resin, poly-N-vinylimidazole, a polyethylene oxide resin, ethyl cellulose, an ethylene-acrylic acid copolymer, casein, a polyamide resin, an N-methoxymethylated 6-nylon resin, a copolymerized nylon resin, a phenol resin, a polyurethane resin, an epoxy resin, an acrylic resin, a melamine resin, and a polyester resin.

Metal oxide particles may be further incorporated into the undercoat layer. The metal oxide particles are, for example, particles containing titanium oxide, zinc oxide, tin oxide, zirconium oxide, or aluminum oxide. In addition, the metal oxide particles may be metal oxide particles each having a surface treated with a surface treatment agent such as a silane coupling agent.

The thickness of the undercoat layer is preferably 0.05 μm or more and 30 μm or less, more preferably 1 μm or more and 25 μm or less. Organic resin fine particles or a leveling agent may be further incorporated into the undercoat layer.

<Charge-Generating Layer>

Next, the charge-generating layer is described. The charge-generating layer may be formed by: applying an application liquid for a charge-generating layer obtained by subjecting a charge-generating substance to dispersion treatment together with a binder resin and a solvent to form a coat; and drying the resultant coat. Alternatively, the charge-generating layer may be a deposited film of the charge-generating substance.

Examples of the charge-generating substance to be used for the charge-generating layer include azo pigments, phthalocyanine pigments, indigo pigments, perylene pigments, polycyclic quinone pigments, squarylium dyes, pyrylium salts, thiapyrylium salts, triphenylmethane dyes, quinacridone pigments, azulenium salt pigments, cyanine dyestuffs, anthanthrone pigments, pyranthrone pigments, xanthene dyes, quinone imine dyes, and styryl dyes. Those charge-generating substances may be used alone or in combination thereof. Of those charge-generating substances, from the viewpoint that excellent sensitivity can be obtained, phthalocyanine pigments or azo pigments are preferred, and phthalocyanine pigments are particularly more preferred.

Of the phthalocyanine pigments, in particular, oxytitanium phthalocyanines, chlorogallium phthalocyanines, or hydroxygallium phthalocyanines exhibit excellent charge generation efficiency. Further, of the hydroxygallium phthalocyanines, the following hydroxygallium phthalocyanine crystal is more preferred from the viewpoint that more excellent sensitivity can be obtained: a hydroxygallium phthalocyanine crystal of a crystal form having peaks at Bragg angles 2θ in CuKα characteristic X-ray diffraction of $7.4°±0.3°$ and $28.2°±0.3°$.

Examples of the binder resin to be used for the charge-generating layer include: polymers of vinyl compounds, such as styrene, vinyl acetate, vinyl chloride, an acrylic acid ester, a methacrylic acid ester, vinylidene fluoride, and trifluoroethylene; and a polyvinyl alcohol resin, a polyvinyl acetal resin, a polycarbonate resin, a polyester resin, a polysulfone resin, a polyphenylene oxide resin, a polyurethane resin, a cellulose resin, a phenol resin, a melamine resin, a silicon resin, and an epoxy resin.

The mass ratio between the charge-generating substance and the binder resin preferably falls within the range of from 1:0.3 to 1:4.

The thickness of the charge-generating layer is preferably 0.05 μm or more and 1 μm or less, more preferably 0.1 μm or more and 0.5 μm or less.

<First Hole-Transporting Layer>

Next, the first hole-transporting layer is described. The first hole-transporting layer may be formed by: forming a coat of an application liquid for a hole-transporting layer obtained by mixing a hole-transporting substance and a binder resin in a solvent; and drying the coat. Now, the hole-transporting substance and the binder resin to be used in the hole-transporting layer are described.

Examples of the hole-transportable substance include a carbazole compound, a hydrazone compound, an N,N-dialkylaniline compound, a diphenylamine compound, a triphenylamine compound, a triphenylmethane compound, a pyrazoline compound, a styryl compound, and a stilbene compound.

Examples of the binder resin include an acrylic acid ester, a methacrylic acid ester, a polyvinyl alcohol resin, a polyvinyl acetal resin, a polycarbonate resin, and a polyester resin. In addition, there may be used a curable resin, such as a curable phenol resin, a curable urethane resin, a curable melamine resin, a curable epoxy resin, a curable acrylic resin, or a curable methacrylic resin.

Examples of the solvent to be used for the application liquid for a first hole-transporting layer include an alcohol-based solvent, a sulfoxide-based solvent, a ketone-based solvent, an ether-based solvent, an ester-based solvent, an aliphatic halogenated hydrocarbon-based solvent, and an aromatic hydrocarbon-based solvent.

The thickness of the first hole-transporting layer is preferably 1 μm or more and 100 μm or less, more preferably 3 μm or more and 50 μm or less, still more preferably 5 μm or more and 40 μm or less.

Various additives may be added to the respective layers of the electrophotographic photosensitive member of the present invention. Specific examples thereof include an organic pigment, an organic dyestuff, a coat surface adjustor, an electron-transporting agent, an oil, a wax, an antioxidant, a light absorber, a polymerization initiator, a radical deactivator, organic resin fine particles, and inorganic particles.

The surface of each layer of the electrophotographic photosensitive member may be subjected to surface processing with, for example, an abrasive sheet, a shape transfer die member, glass beads, or zirconia beads. In addition, unevenness may be formed in the surface with a constituent material for the application liquid.

In the application of the application liquid for each of the layers, there may be used any known application method, such as a dip coating method, a spray coating method, a circular amount-regulating type (ring) coating method, a spin coating method, a roller coating method, a Mayer bar coating method, or a blade coating method.

Next, a process cartridge including the electrophotographic photosensitive member of the present invention and an image forming process are described.

<Process Cartridge and Image Forming Process>

FIG. 1 is an illustration of an example of the configuration of the process cartridge. In FIG. 1, an electrophotographic photosensitive member 1 having a cylindrical shape is rotationally driven in an arrow direction at a predetermined peripheral speed. The peripheral surface of the electrophotographic photosensitive member 1 to be rotationally driven is uniformly charged to a predetermined positive or negative potential by a charging unit 2. Next, the charged peripheral surface of the electrophotographic photosensitive member 1 receives exposure light (image exposure light) 3 emitted from an exposing unit (not shown), such as slit exposure or laser beam scanning exposure. Thus, electrostatic latent images corresponding to a target image are sequentially formed on the peripheral surface of the electrophotographic photosensitive member 1. Any one of a voltage obtained by superimposing an AC component on a DC component and a voltage consisting of the DC component may be used as a voltage to be applied to the charging unit (e.g., charging roller) 2.

The electrostatic latent images formed on the peripheral surface of the electrophotographic photosensitive member 1 are developed with toner in the developer of a developing unit 4 to be turned into toner images. Next, the toner images formed and borne on the peripheral surface of the electrophotographic photosensitive member 1 are sequentially transferred onto a transfer material (e.g., paper or intermediate transfer member) 6 by a transfer bias from a transfer-ring unit (e.g., transfer roller) 5. The transfer material 6 is fed in synchronization with the rotation of the electrophotographic photosensitive member 1.

The surface of the electrophotographic photosensitive member 1 after the transfer of the toner images is subjected to electricity-eliminating treatment with pre-exposure light 7 from a pre-exposing unit (not shown), and is then cleaned through the removal of transfer residual toner by a cleaning unit 8. Thus, the electrophotographic photosensitive member 1 is repeatedly used in image formation. The pre-exposing unit may be operated before or after the cleaning step. In the process cartridge according to the present invention, the pre-exposing unit is not needed.

The electrophotographic photosensitive member 1 may be mounted onto an electrophotographic apparatus, such as a copying machine or a laser beam printer. In addition, a process cartridge 9, which is formed by storing a plurality of constituent components out of the constituent components, such as the electrophotographic photosensitive member 1, the charging unit 2, the developing unit 4, and the cleaning unit 8, in a container, and integrally supporting the components, may be formed so as to be removably mounted onto the main body of the electrophotographic apparatus. In FIG. 1, there is formed the process cartridge 9, which integrally supports the electrophotographic photosensitive member 1, the charging unit 2, the developing unit 4, and the cleaning unit 8, and is removably mounted onto the main body of the electrophotographic apparatus.

Next, an electrophotographic apparatus including the electrophotographic photosensitive member of the present invention is described.

Figure 2:
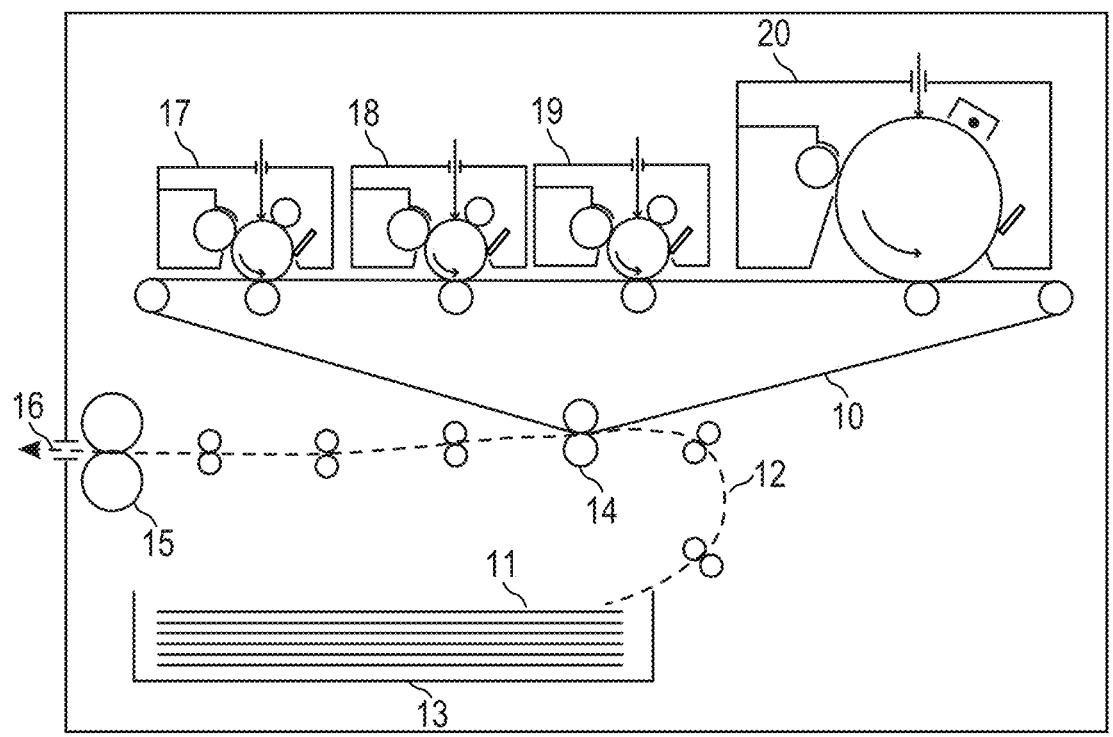
FIG. 2 is a schematic view for illustrating an example of an electrophotographic apparatus including an electrophotographic photosensitive member.

FIG. 2 is an illustration of an example of the configuration of the electrophotographic apparatus of the present invention. A process cartridge 17 for a yellow color, a process cartridge 18 for a magenta color, a process cartridge 19 for a cyan color, and a process cartridge 20 for a black color are arranged side by side along an intermediate transfer member 10. As illustrated in FIG. 2, the diameter and constituent material of the electrophotographic photosensitive member, a developer, a charging system, and any other unit do not necessarily need to be standardized for the respective colors. For example, in the electrophotographic apparatus of FIG. 2, the diameter of the electrophotographic photosensitive member of the process cartridge for the black color is larger than the diameters of the electrophotographic photosensitive members of the process cartridges for the colors for color printing (yellow, magenta, and cyan). In addition, while charging systems for the colors for color printing are each a system involving applying a voltage obtained by superimposing an AC component on a DC component, a system involving using corona discharge is adopted for the black color.

When an image forming operation starts, the toner images of the respective colors are sequentially superimposed on the intermediate transfer member 10 according to the image forming process. In tandem with the foregoing, a transfer sheet 11 is sent from a sheet feeding tray 13, conveyed along a sheet feeding path 12, and is then fed to a secondary transferring unit 14 in timing with the rotation operation of the intermediate transfer member. The toner images on the intermediate transfer member 10 are transferred onto the transfer sheet 11 by a transfer bias from the secondary transferring unit 14. The toner images transferred onto the transfer sheet 11 are conveyed along the sheet feeding path 12, fixed on the transfer sheet by a fixing unit 15, and discharged from a sheet discharging portion 16.

Next, examples of the hole-transportable compound having a chain polymerizable functional group of the present invention, which is represented by the formula (1), are listed below. However, the compound is not limited to the following examples.

Exemplified Compound 1-1

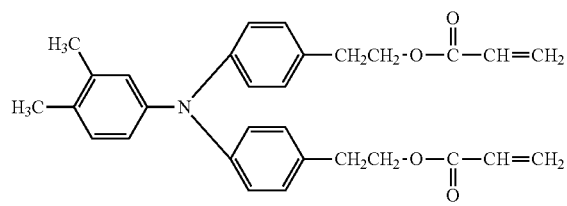

Exemplified Compound 1-2

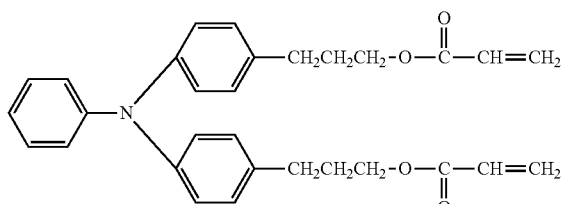

Exemplified Compound 1-3

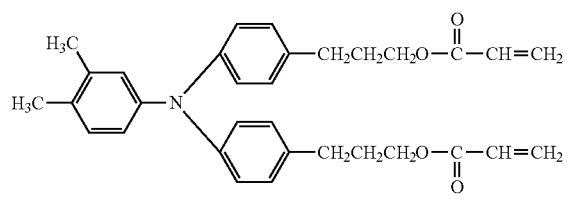

Exemplified Compound 1-4

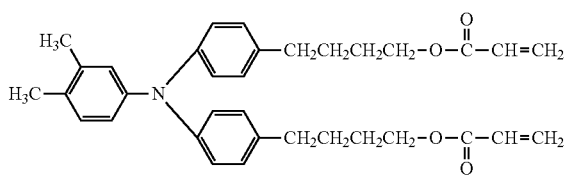

Exemplified Compound 1-5

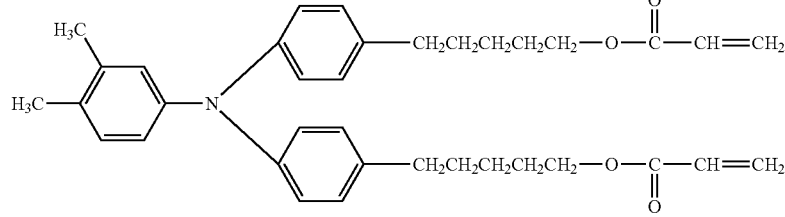

Exemplified Compound 1-6

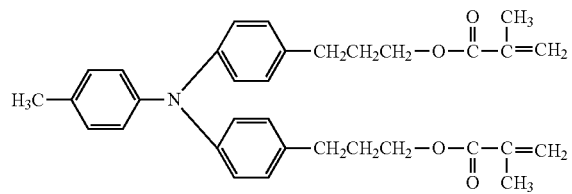

Exemplified Compound 1-7

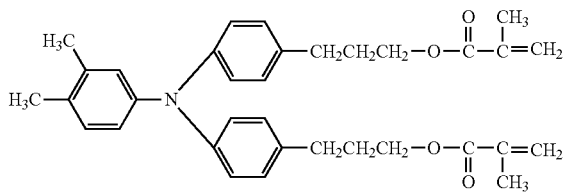

-continued
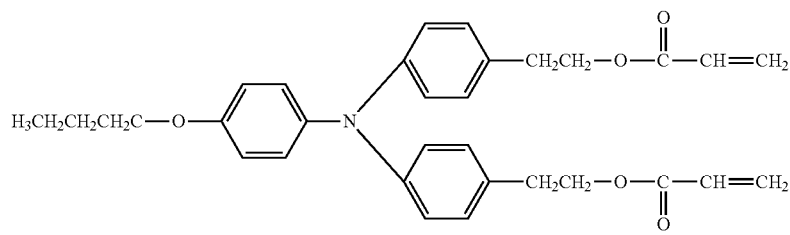
Exemplified Compound 1-8
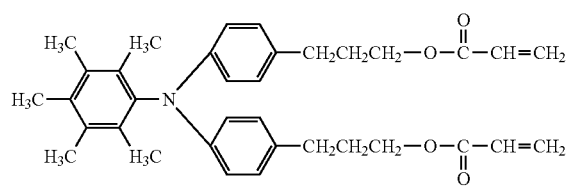
Exemplified Compound 1-9
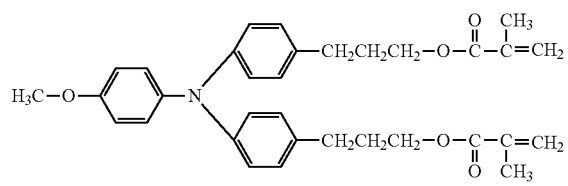
Exemplified Compound 1-10
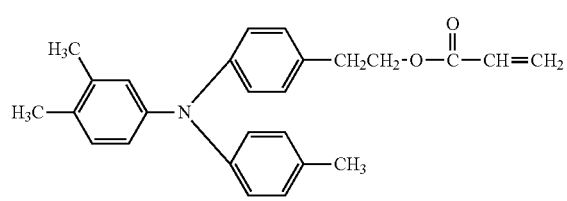
Exemplified Compound 1-11
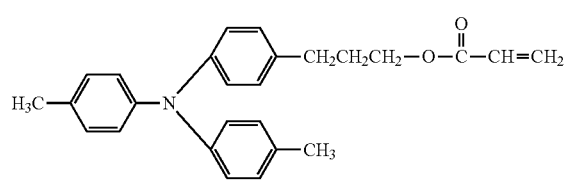
Exemplified Compound 1-12
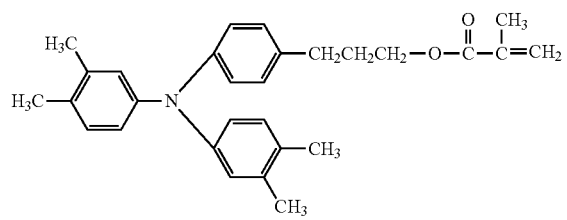
Exemplified Compound 1-13
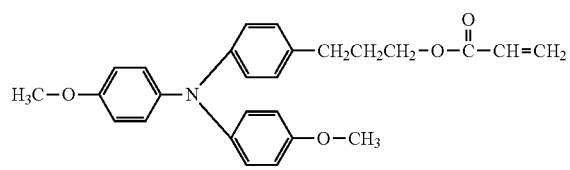
Exemplified Compound 1-14
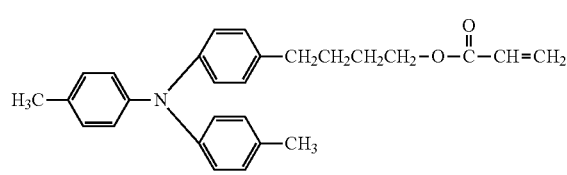
Exemplified Compound 1-15
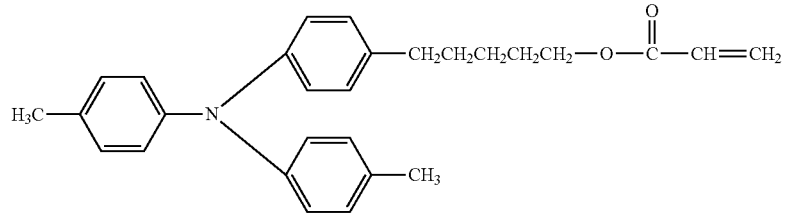
Exemplified Compound 1-16
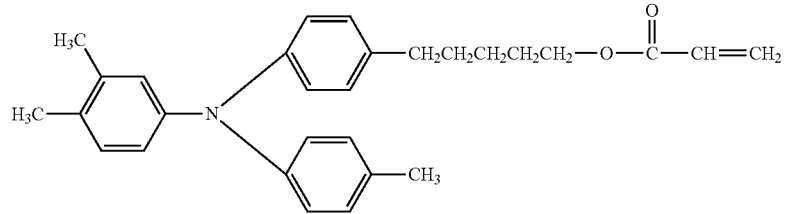
Exemplified Compound 1-17

-continued

Exemplified Compound 1-18

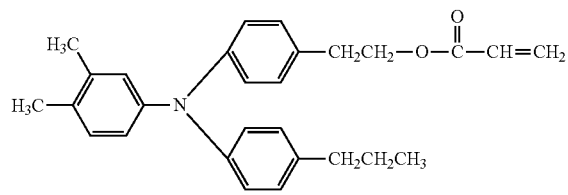

Exemplified Compound 1-19

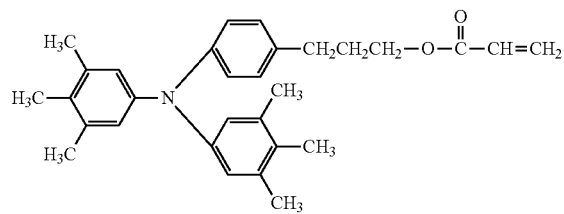

Exemplified Compound 1-20

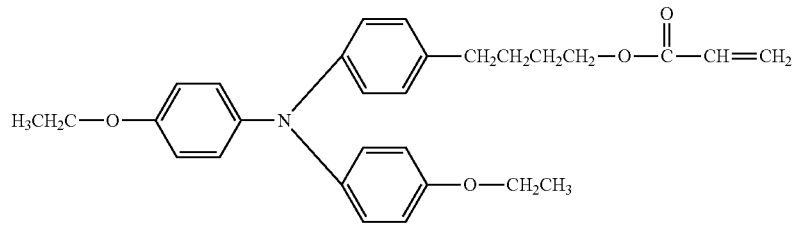

In addition, examples of the compound represented by the formula (2) are listed below. However, the compound is not limited to the following examples.

Exemplified Compound 2-1

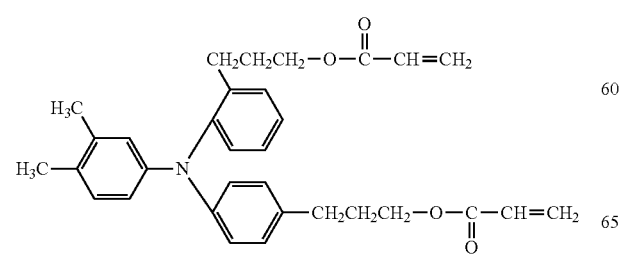

Exemplified Compound 2-4

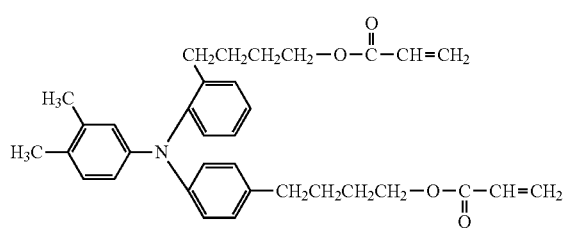

Exemplified Compound 2-5

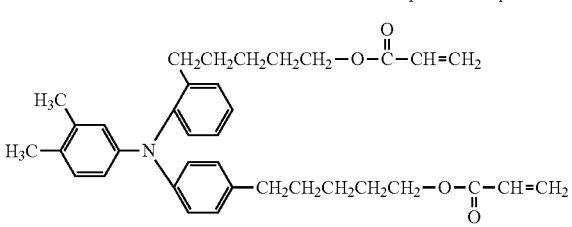

Exemplified Compound 2-6

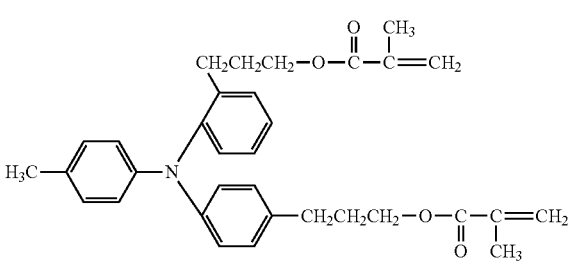

Exemplified Compound 2-7

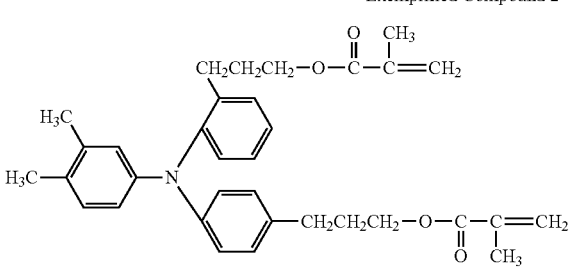

Exemplified Compound 2-2

Exemplified Compound 2-3

Exemplified Compound 2-8
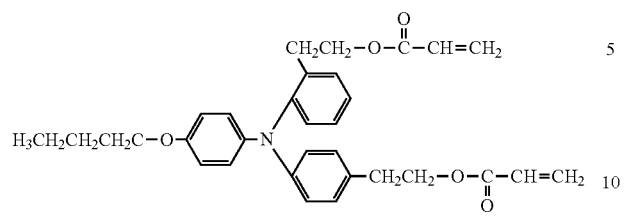
Exemplified Compound 2-9
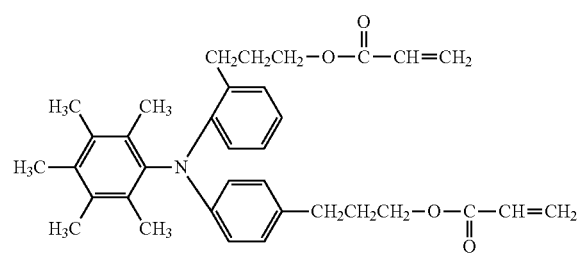
Exemplified Compound 2-10
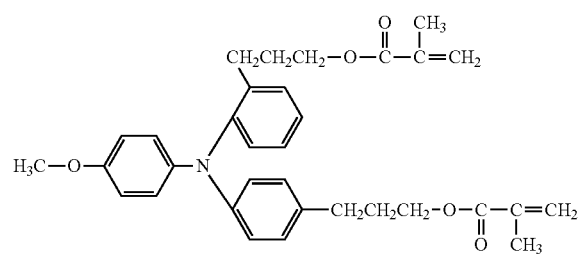
Exemplified Compound 2-11
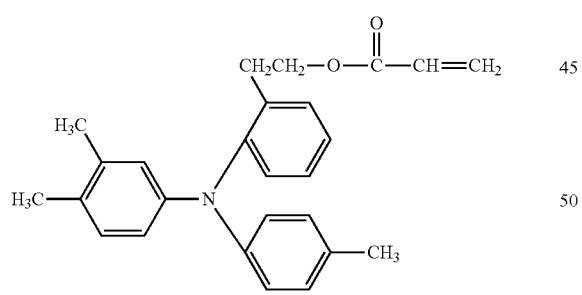
Exemplified Compound 2-12
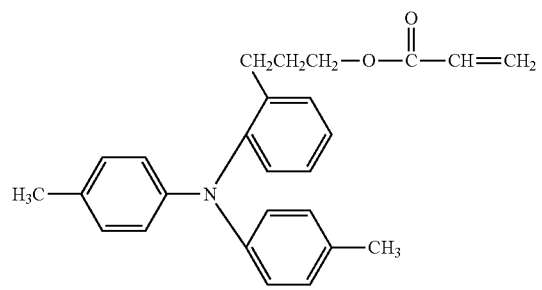
Exemplified Compound 2-13
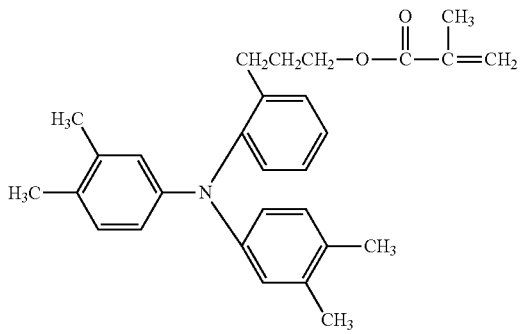
Exemplified Compound 2-14
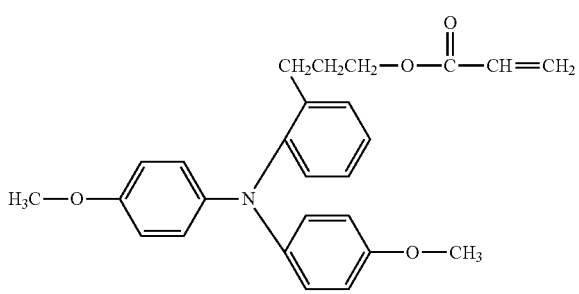
Exemplified Compound 2-15
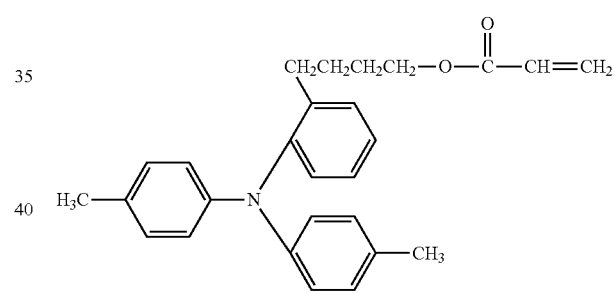
Exemplified Compound 2-16
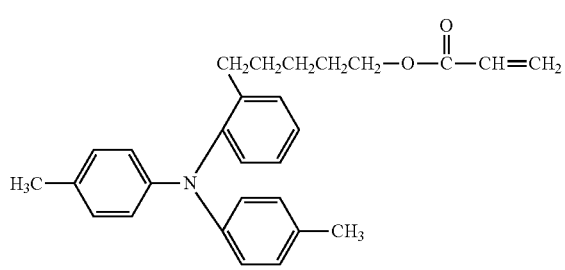
Exemplified Compound 2-17
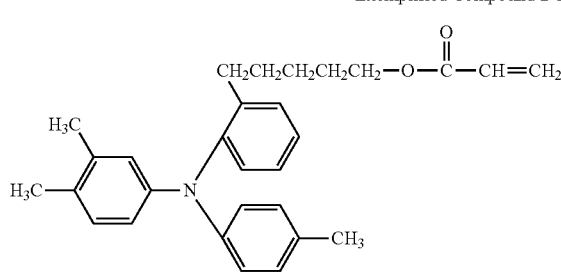

Exemplified Compound 2-18
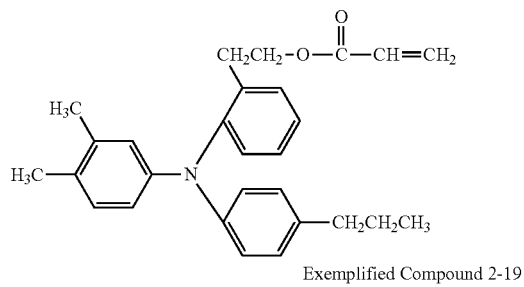
Exemplified Compound 2-19
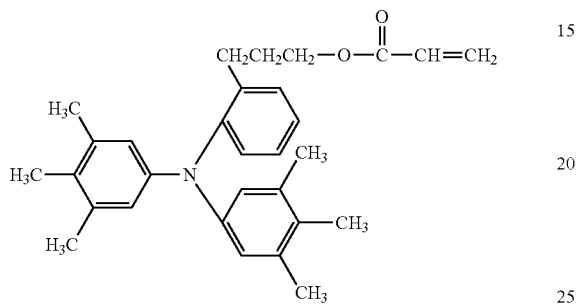
Exemplified Compound 2-20
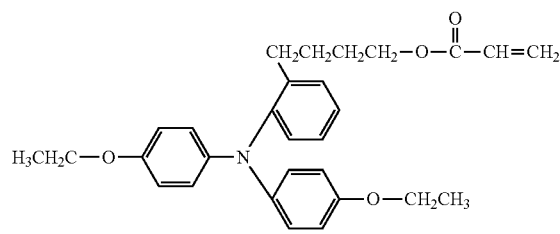
In addition, examples of the compound represented by the formula (3) are listed below. However, the compound is not limited to the following examples.
Exemplified Compound 3-1
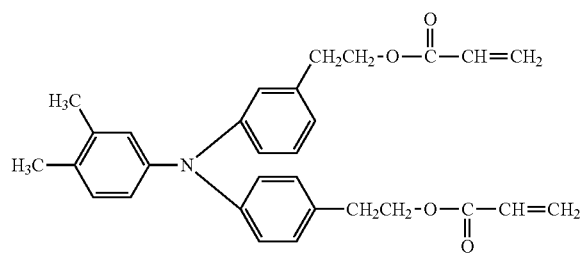
Exemplified Compound 3-2
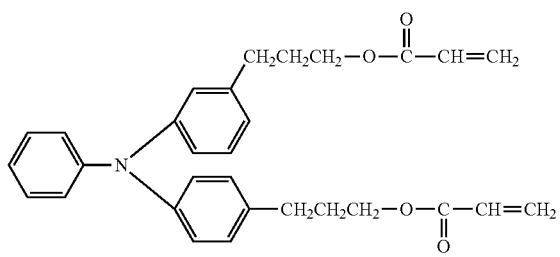
Exemplified Compound 3-3
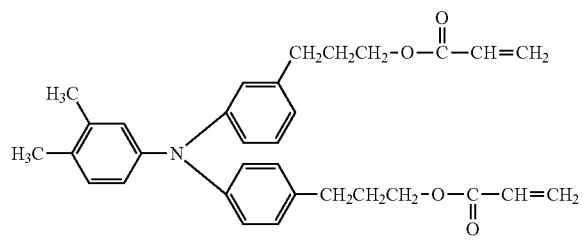
Exemplified Compound 3-4
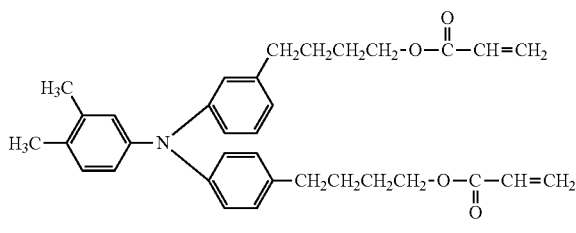
Exemplified Compound 3-5
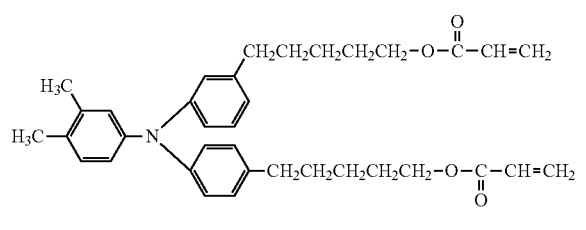
Exemplified Compound 3-6
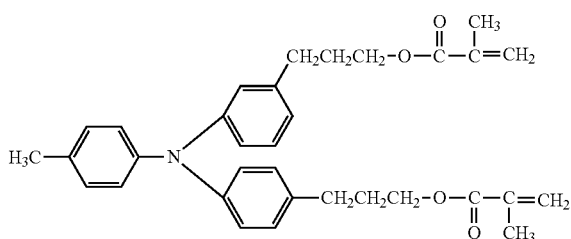

-continued
Exemplified Compound 3-7
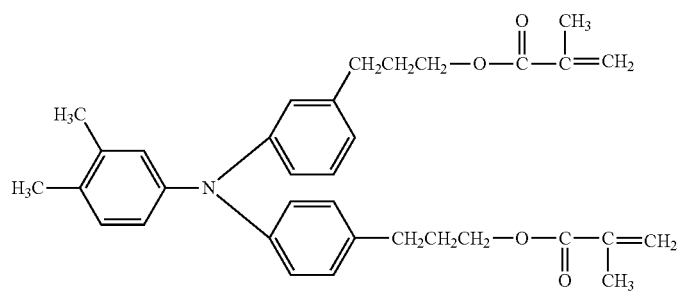
Exemplified Compound 3-8
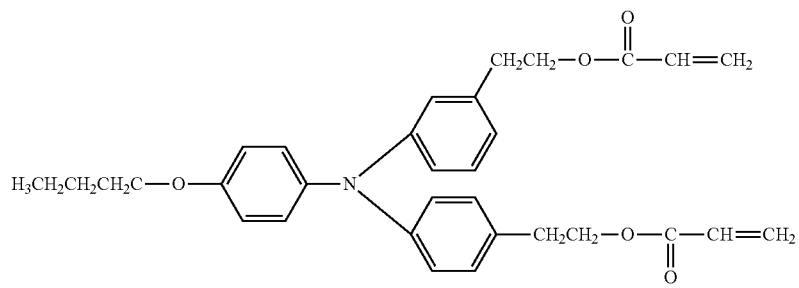
Exemplified Compound 3-9
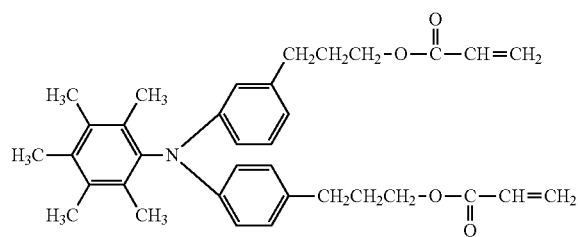
Exemplified Compound 3-10
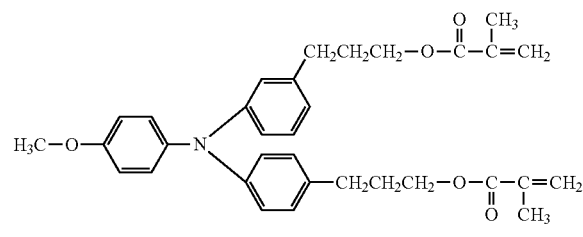
Exemplified Compound 3-11
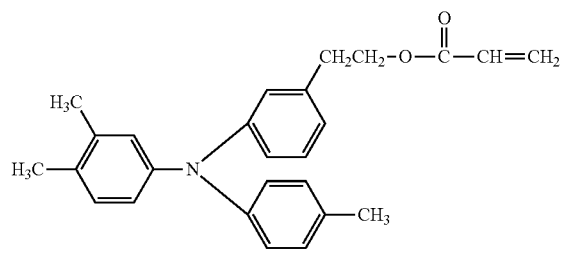
Exemplified Compound 3-12
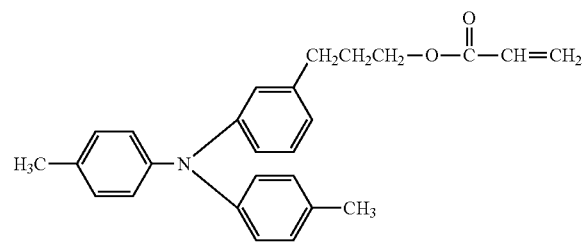
Exemplified Compound 3-13
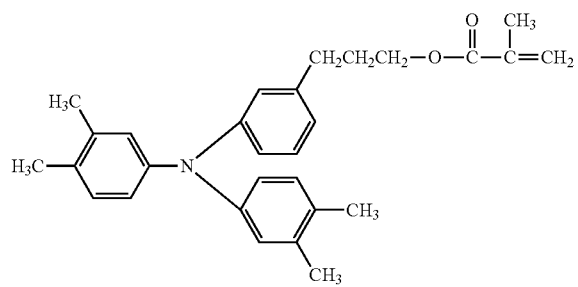
Exemplified Compound 3-14
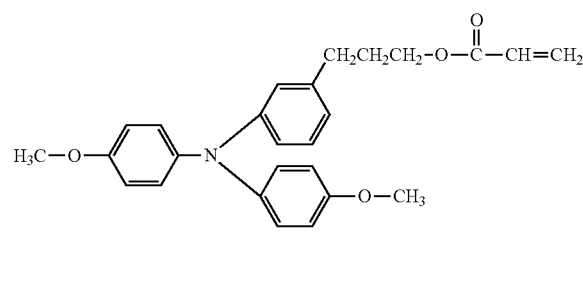

Exemplified Compound 3-15

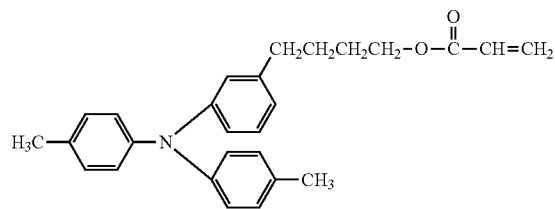

Exemplified Compound 3-16

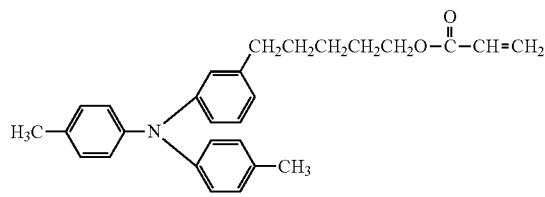

Exemplified Compound 3-17

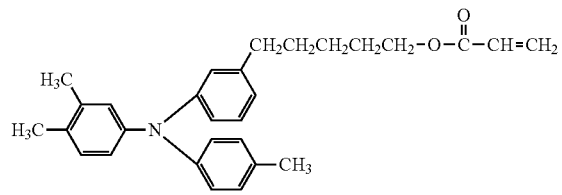

Exemplified Compound 3-18

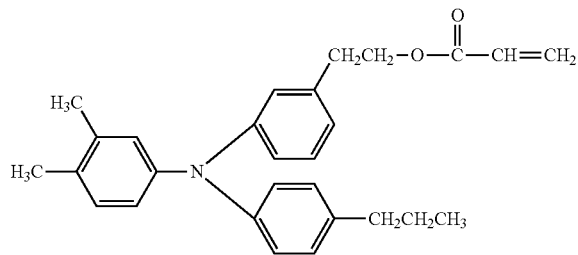

Exemplified Compound 3-19

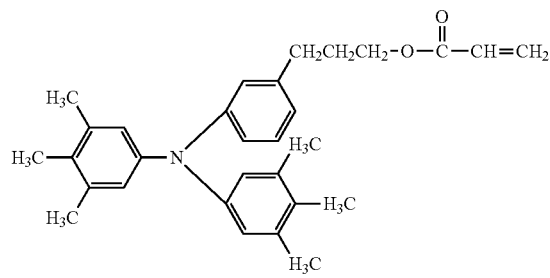

Exemplified Compound 3-20

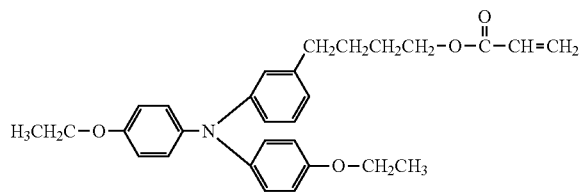

Typical synthesis examples of the hole-transportable compounds to be used in the present invention are described below.

Synthesis Example 1

A synthesis example of a bifunctional hole-transportable compound having polymerizable acrylic groups, which is represented by the formula (2) and is represented by Exemplified Compound No. 2-3, is described.

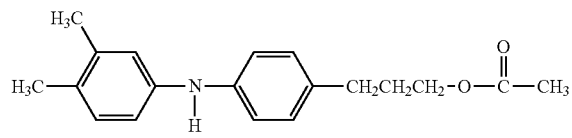

+

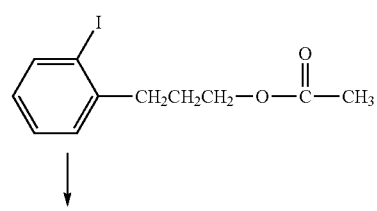

↓

-continued

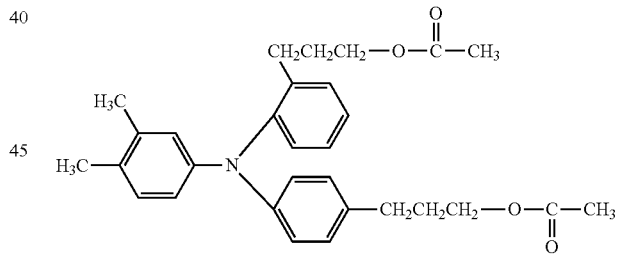

Reaction formula (1)

A triarylamine body was synthesized by using an iodine body and an amine compound as represented by the reaction formula (1). 47.9 Parts of the iodine body, 36.0 parts of the amine body in the formula, and 60 parts of o-dichlorobenzene were mixed in a reaction vessel, and 18.4 parts of potassium carbonate and 9.2 parts of copper powder were added to the mixture. A temperature in the vessel was set to about 210° C., and the mixture was subjected to a reaction. The mixture was subjected to the reaction by being stirred for about 16 hours. After the reaction, the resultant was filtered, washed with toluene, and concentrated to provide a crude product.

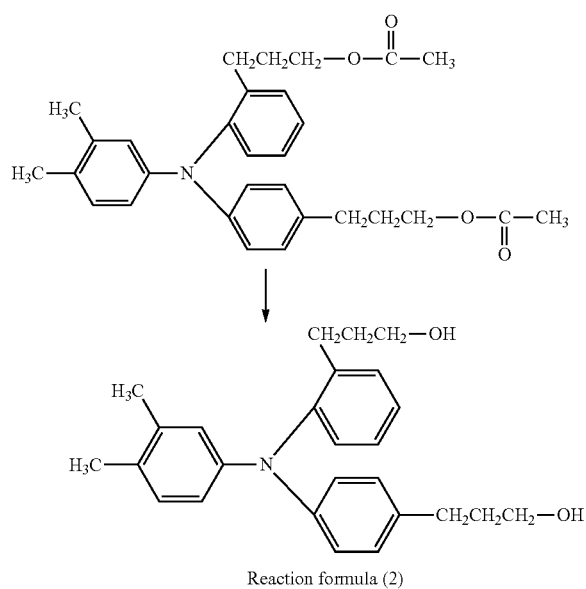

Reaction formula (2)

Subsequently, the resultant intermediate was hydrolyzed so that its acetate groups were changed to hydroxy groups. The hydrolysis was performed by: mixing 75 parts of tetrahydrofuran, 75 parts of methanol, and 55 parts of a 24% aqueous solution of sodium hydroxide into the intermediate; heating the inside of the vessel to a temperature of 60° C.; and stirring the mixture to subject the mixture to a reaction for 1 hour. After the reaction, the reaction mixture was extracted with ethyl acetate, and then the organic layer was washed with water, washed with brine, dehydrated, and concentrated. The concentrate was purified by silica gel chromatography to provide a dihydroxy intermediate in a yield of 30.5 parts and a percent yield (two stages) of 64.5%.

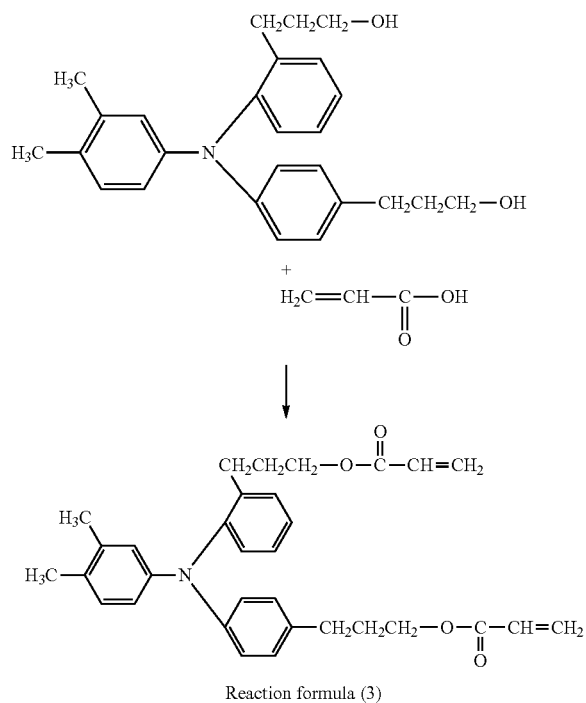

Reaction formula (3)

30 Parts of the dihydroxy intermediate obtained by the above-mentioned reaction, 340 parts of toluene, and 0.6 parts of 4-methoxyphenol were mixed, and 13.3 parts of acrylic acid was loaded into the reaction vessel. 1.3 Parts of p-toluenesulfonic acid monohydrate was added to the mixture, and the whole was heated under a reflux condition at 112° C. for 6 hours to be subjected to an acrylation reaction.

After the reaction, the resultant was cooled, and a 10% aqueous solution of sodium hydroxide was loaded to neutralize the resultant, followed by extraction with ethyl acetate. The extract was washed with water, dehydrated, and concentrated to provide a crude product.

Subsequently, the crude product was purified by silica gel column chromatography to provide a hole-transportable compound having a polymerizable functional group in a yield of 31.0 parts and a percent yield of 80.9%.

Further, a varnish was obtained by adjusting the kind of a solvent dissolving the resultant hole-transportable compound and the amount of the solvent. The other hole-transportable compounds represented by the formula (2) and the formula (3) may be similarly synthesized.

EXAMPLES

Now, the present invention is described in more detail by way of specific Examples. The term "part(s)" in Examples means "part(s) by mass". In addition, an electrophotographic photosensitive member is hereinafter sometimes simply referred to as "photosensitive member".

<Production of Electrophotographic Photosensitive Member>

Example 1

A cylindrical aluminum cylinder having an outer diameter of 30.0 mm, a length of 357.5 mm, and a wall thickness of 0.7 mm was used as a support (electroconductive support).

Next, 10 parts of zinc oxide particles (specific surface area: 19 $m^2/g$, powder resistivity: $4.7 \times 10^6$ Ω·cm) were stirred and mixed with 50 parts of toluene, and 0.08 parts of a silane coupling agent was added to the mixture, followed by stirring for 6 hours. After that, toluene was evaporated under reduced pressure, and the residue was dried by heating at 130° C. for 6 hours to provide surface-treated zinc oxide particles. N-2-(Aminoethyl)-3-aminopropylmethyldimethoxysilane (product name: KBM-602, manufactured by Shin-Etsu Chemical Co., Ltd.) was used as the silane coupling agent.

Next, 15 parts of a polyvinyl butyral resin (weight-average molecular weight: 40,000, product name: BM-1, manufactured by Sekisui Chemical Co., Ltd.) and 15 parts of a blocked isocyanate (product name: DURANATE TPA-B80E, manufactured by Asahi Kasei Chemicals Corporation) were prepared. Those materials were dissolved in a mixed solution of 73.5 parts of methyl ethyl ketone and 73.5 parts of 1-butanol. 80.8 Parts of the surface-treated zinc oxide particles and 0.8 parts of 2,3,4-trihydroxybenzophenone (manufactured by Wako Pure Chemical Industries, Ltd.) were added to the solution, and the mixture was dispersed with a sand mill apparatus using glass beads each having a diameter of 0.8 mm under an atmosphere at 23±3° C. for 3 hours. After the dispersion, the following materials were added to the resultant, and the mixture was stirred to prepare an application liquid for an undercoat layer.

Silicone oil (product name: SH28PA, manufactured by Dow Corning Toray Co., Ltd.) 0.01 parts Crosslinked polymethyl methacrylate (PMMA) particles (product name: TECHPOLYMER SSX-102, manufactured by Sekisui Kasei Co., Ltd., average primary particle diameter: 2.5 μm) 5.6 parts The application liquid for an undercoat layer was applied onto the support by dip coating to form a coat, and the resultant coat was dried for 40 minutes at 160° C. to form an undercoat layer having a thickness of 18 μm.

Next, 2 parts of a hydroxygallium phthalocyanine crystal (charge-generating substance) of a crystal form having peaks at Bragg angles 2θ±0.2° in CuKα characteristic X-ray diffraction of 7.4° and 28.2° was prepared. Further, 0.02 parts of a calixarene compound represented by the following formula (A), 1 part of polyvinyl butyral (product name: S-LEC BX-1, manufactured by Sekisui Chemical Co., Ltd.), and 60 parts of cyclohexanone were prepared. Those materials were loaded into a sand mill using glass beads each having a diameter of 1 mm, followed by dispersion treatment for 4 hours. After that, 70 parts of ethyl acetate was added to the resultant to prepare an application liquid for a charge-generating layer. The application liquid for a charge-generating layer was applied onto the undercoat layer by dip coating, and the resultant coat was dried for 15 minutes at 90° C. to form a charge-generating layer having a thickness of 0.18 μm.

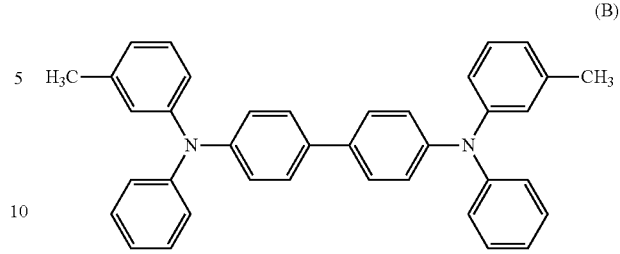

(B)

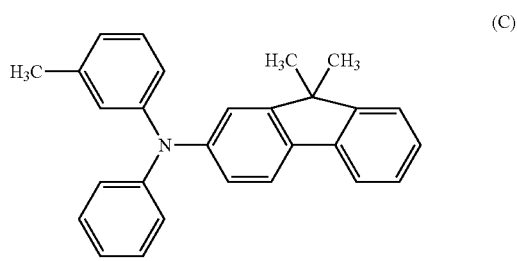

(C)

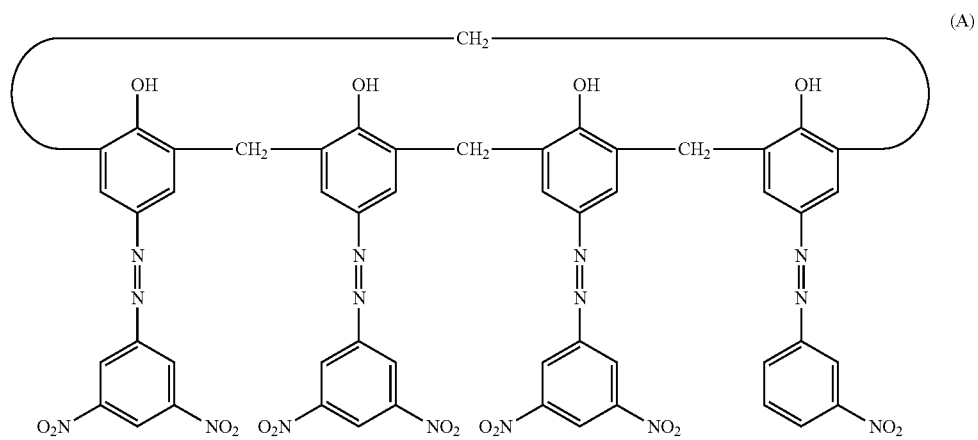

(A)

Next, materials were prepared as described below to form a first hole-transporting layer.

| | |
|---|---|
| Compound represented by the following formula (B) | 6 parts |
| Compound represented by the following formula (C) | 3 parts |
| Compound represented by the following formula (D) | 1 part |
| Bisphenol Z-type polycarbonate resin (product name: Iupilon Z400, manufactured by Mitsubishi Engineering-Plastics Corporation) | 10 parts |

Those materials were dissolved in a mixed solvent containing 35 parts of o-xylene, 35 parts of dimethoxymethane, and 30 parts of methyl benzoate to prepare an application liquid for a charge-transporting layer. The application liquid for a hole-transporting layer was applied onto the charge-generating layer by dip coating, and the resultant coat was dried at 110° C. for 50 minutes to form a hole-transporting layer having a thickness of 18 μm.

-continued

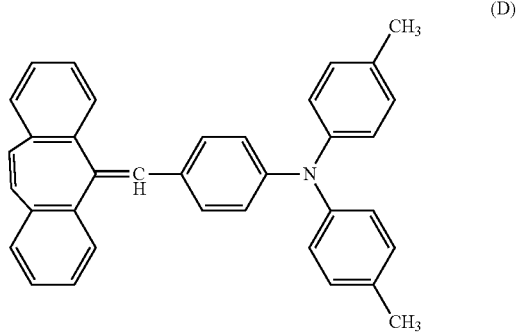

(D)

<Formation of Second Hole-transporting Layer> 1.5 Parts of a fluorine atom-containing acrylic resin (weight-average molecular weight: 83,000, copolymerization ratio (F1)/(F2) =1/1 (molar ratio)) having a repeating structural unit represented by the following formula (F1) and a repeating structural unit represented by the following formula (F2):

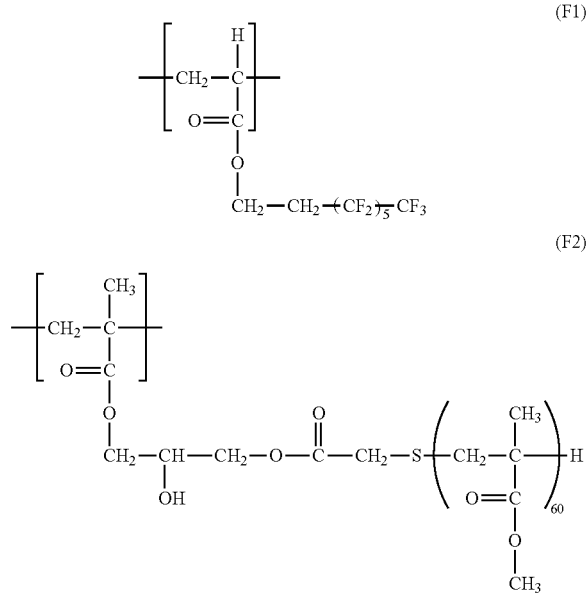

was dissolved in a mixed solvent containing 45 parts of 1-propanol and 45 parts of ZEORORA (trademark) H (manufactured by Zeon Corporation). After that, 30 parts of ethylene fluoride resin powder (product name: LUBRON L-2, manufactured by Daikin Industries, Ltd.) was added to the solution, and was dispersed therein with a high-pressure disperser (product name: Microfluidizer M-110EH, manufactured by Microfluidics, U.S.) to provide an ethylene fluoride resin dispersion.

Next, the following materials were stirred and uniformly dispersed to prepare an application liquid for a protective layer.

| | |
|---|---|
| Hole-transportable compound represented by Exemplified Compound No. 1-3 | 9.90 parts |
| Compound represented by Exemplified Compound No. 2-3 | 0.08 parts |
| Compound represented by Exemplified Compound No. 3-3 | 0.02 parts |
| The above-mentioned ethylene fluoride resin dispersion | 16.60 parts |
| 1-Propanol | 7.20 parts |
| ZEORORA H (cyclic HFC: c-$C_5F_7H_3$) | 7.20 parts |

The application liquid for a protective layer was applied onto the charge-transporting layer by dip coating, and the resultant coat was dried for 10 minutes at 50° C., followed by polymerization curing treatment through electron beam irradiation and heating under the following conditions.

In an atmosphere having an oxygen concentration of 50 ppm or less, the electron beam irradiation was performed with an electron beam irradiation apparatus under the conditions of an irradiation distance of 30 mm, an acceleration voltage of 70 kV, a beam current of 8 mA, and an irradiation time of 3.0 seconds while the aluminum cylinder was rotated at a speed of 300 rpm. After the electron beam irradiation, the temperature of the protective layer coat surface was caused to reach 135° C. over 24 seconds while the state of an oxygen concentration of 50 ppm or less was maintained.

Next, the aluminum cylinder was brought out to an air atmosphere, and was further heated for 12 minutes at 100° C. Thus, a protective layer having a thickness of 5 μm was formed.

The energy value of the highest occupied molecular orbital of a hole-transportable compound to be used in the second hole-transporting layer was calculated as described below.

A SPARTAN'16 manufactured by Wavefunction, Inc. was used as a computational chemistry application. The chemical structure of the hole-transportable compound was input, and the conformation thereof was adjusted. After that, the structure was optimized through use of a semiempirical molecular orbital method (PM3). Next, the energy value was calculated by performing the energy calculation of each molecular structure thereof based on a density functional theory. B3LYP/6-31G* was used as a basis function.

When two or more kinds of hole-transportable compounds represented by the formula (2) and the formula (3) were incorporated into the second hole-transporting layer of the present invention, the value was determined by subjecting the physical property values of the respective materials when used alone to weighted averaging in consideration of the mass ratios of the materials to be used. The calculation results of the energy values are shown in Table 1.

Next, a die member (mold) was arranged on a pressure-contact shape transfer processing apparatus, and an electrophotographic photosensitive member before recess formation thus produced was subjected to surface processing.

Figure 3:
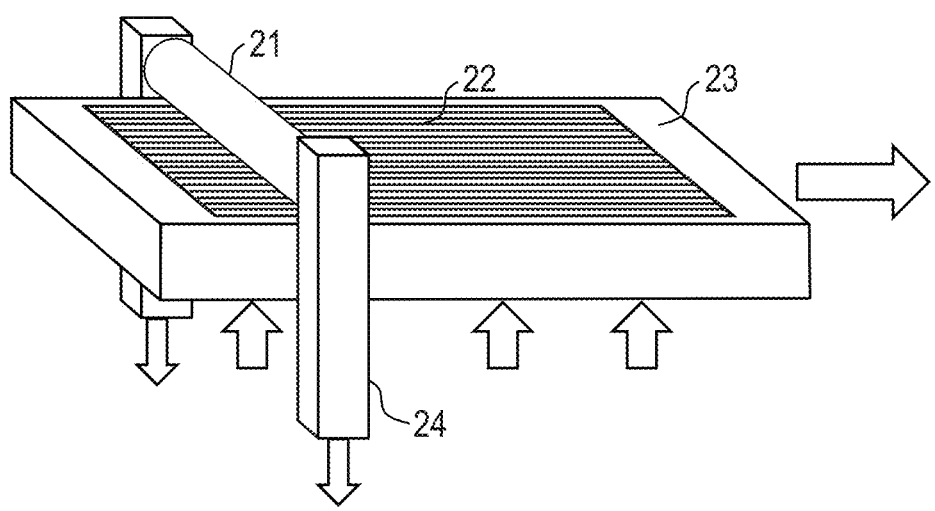
FIG. 3 is a schematic view for illustrating an example of an apparatus for subjecting the surface of an electrophotographic photosensitive member to pressure-contact shape transfer processing.

FIG. 3 is a schematic view for illustrating an example of an apparatus for subjecting the surface of the electrophotographic photosensitive member to pressure-contact shape transfer processing.

As illustrated in FIG. 3, the apparatus includes a molding die 22, a pressurizing member 23, and a supporting member 24.

Figure 4A:
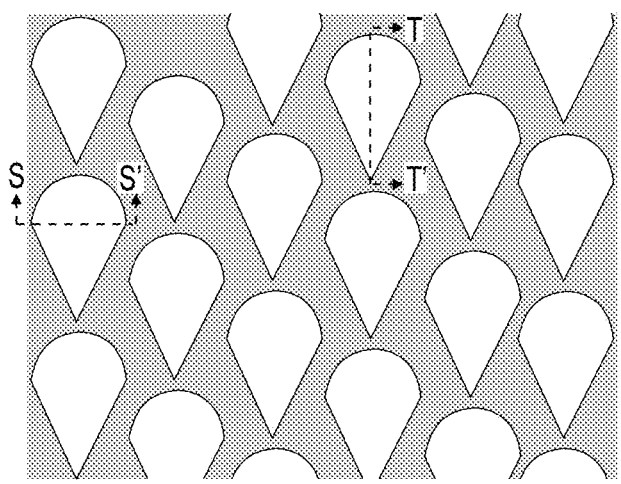
FIG. 4A, FIG. 4B, and FIG. 4C are each a schematic view for illustrating an example of a stamper molding die to be used in pressure bonding processing.
Figure 4B:
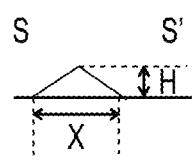
Figure 4C:
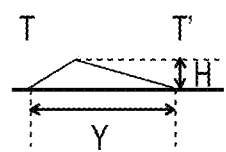

FIG. 4A to FIG. 4C are views for illustrating a mold used in each of Examples and Comparative Examples.

The mold illustrated in each of FIG. 4A to FIG. 4C was arranged on the pressure-contact shape transfer processing apparatus illustrated in FIG. 3, and an electrophotographic photosensitive member 21 before recess formation thus produced was subjected to surface processing.

FIG. 4A is a top view for illustrating the outline of the mold. FIG. 4B is a schematic sectional view of a protrusion of the mold in the axial direction of the electrophotographic photosensitive member 21 (sectional view taken along the line S-S' of FIG. 4A). FIG. 4C is a sectional view of a protrusion of the mold in the peripheral direction of the electrophotographic photosensitive member 21 (sectional view taken along the line T-T' of FIG. 4A).

The mold illustrated in each of FIG. 4A to FIG. 4C has protrusions each having a maximum width X of 50 μm, a maximum length Y of 75 μm, and a height H of 4 μm, the protrusions having an area ratio of 56%.

The maximum width X is the maximum width in the axial direction of the electrophotographic photosensitive member 21 when the protrusions on the mold are viewed from above.

The maximum length Y is the maximum length in the peripheral direction of the electrophotographic photosensitive member 21 when the protrusions on the mold are viewed from above.

The area ratio is the ratio of the area of the protrusions in the entirety of the surface of the mold when the mold is viewed from above.

At the time of the processing, the temperatures of the electrophotographic photosensitive member 21 and the mold were controlled so that the temperature of the surface of the electrophotographic photosensitive member 21 became 120° C. Then, recesses were formed in the entire surface of the surface layer (peripheral surface) of the electrophotographic photosensitive member 21 by rotating the electrophotographic photosensitive member 21 in the peripheral direction while pressing the electrophotographic photosensitive member 21 against the mold at a pressure of 7.0 MPa. Thus, the electrophotographic photosensitive member 21 was produced.

The surface of the resultant electrophotographic photosensitive member 21 was observed in an enlarged manner with a laser microscope (product name: X-100, manufactured by Keyence Corporation) through a lens having a magnification of 50. Thus, the recesses formed in the surface of the electrophotographic photosensitive member 21 were observed. At the time of the observation, adjustment was performed so that no slope was present in the longitudinal direction of the electrophotographic photosensitive member 21, and so that the apex of the arc of the electrophotographic photosensitive member 21 came into focus with regard to the peripheral direction. Images subjected to the enlarged observation were linked to each other with an image-linking application to provide a square region 500 μm on a side. Then, image processing height data was selected from the obtained results with image analysis software attached to the microscope, and was subjected to filtering treatment with a filter type median.

As a result of the observation, the recesses each had a depth of 2 and their opening portions each had a width of 50 μm in the axial direction and a length of 75 μm in the peripheral direction. The opening portions had an area of 140,000 μm². The area is the area of the recesses when the surface of the electrophotographic photosensitive member 21 is viewed from above, and the area means the total area of the opening portions of the recesses.

Thus, a photosensitive member according to Example 1 was produced.

Examples 2 to 17

Application liquids for protective layers were prepared in the same manner as in Example 1 by using materials shown in Table 1A instead of the hole-transportable compounds used in Example 1. Photosensitive members were produced in the same manner as in Example 1 except the foregoing.

Example 18

An application liquid for a protective layer was prepared in the same manner as in Example 1 by using materials shown in Table 1A instead of the hole-transportable compounds used in Example 1, and by using 2.5 parts of a polymerizable compound free of hole transportability represented by the following formula (G). A photosensitive member was produced in the same manner as in Example 1 except the foregoing.

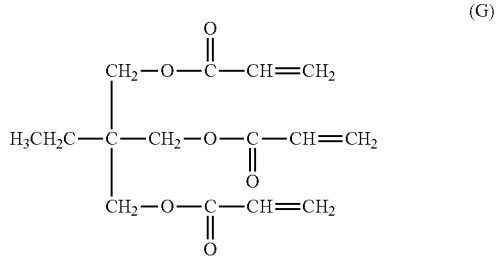

(G)

Examples 19 to 27

Application liquids for protective layers were each prepared in the same manner as in Example 1 by using materials shown in Table 1A instead of the hole-transportable compounds used in Example 1, and 2.5 parts of a polymerizable compound free of hole transportability represented by the formula (G). Photosensitive members were produced in the same manner as in Example 1 except the foregoing.

Example 28

An application liquid for a protective layer was prepared in the same manner as in Example 1 by using the following materials instead of the hole-transportable compounds used in Example 1:

6.93 parts of the hole-transportable compound represented by Exemplified Compound No. 1-3, 0.056 parts of the compound represented by Exemplified Compound No. 2-3, and 0.014 parts of the compound represented by Exemplified Compound No. 3-3; and 2.97 parts of a hole-transportable compound represented by Exemplified Compound No. 1-12, 0.024 parts of a compound represented by Exemplified Compound No. 2-12, and 0.006 parts of a compound represented by Exemplified Compound No. 3-12. A photosensitive member was produced in the same manner as in Example 1 except the foregoing.

Comparative Examples 1, 3, and 5

Photosensitive members were each produced in the same manner as in Example 1 except that an exemplified compound represented by the formula (1), which was shown in Table 1, was used instead of the hole-transportable compounds used in Example 1.

Comparative Examples 2, 4, and 6

Application liquids for protective layers were each prepared in the same manner as in Example 1 by using 9.90 parts of an exemplified compound represented by the formula (1) and 0.10 parts of an exemplified compound represented by the formula (2), which were shown in Table 1, instead of the hole-transportable compounds used in Example 1. Photosensitive members were produced in the same manner as in Example 1 except the foregoing.

Comparative Examples 7, 9, and 11

Application liquids for protective layers were each prepared in the same manner as in Example 1 by using 7.50 parts of an exemplified compound represented by the formula (1) and 2.5 parts of a polymerizable compound free of hole-transportability represented by the formula (G), which were shown in Table 1, instead of the hole-transportable compounds used in Example 1. Photosensitive members were produced in the same manner as in Example 1 except the foregoing.

Comparative Examples 8, 10, and 12

Application liquids for protective layers were each prepared in the same manner as in Example 1 by using the following materials, which were shown in Table 1, instead of the hole-transportable compounds used in Example 1. Photosensitive members were produced in the same manner as in Example 1 except the foregoing.

| | |
|---|---|
| Exemplified compound represented by the formula (1) | 7.0125 parts |
| Exemplified compound represented by the formula (2) | 0.4875 parts |
| Polymerizable compound free of hole-transportability represented by the formula (G) | 2.5 parts |

<Evaluation of Ghost Phenomenon-suppressing Effect>

A ghost image evaluation was performed as described below by using each of example photosensitive members 1 to 28 and comparative example photosensitive members 1 to 12 thus produced.

A reconstructed machine of a copying machine available under the product name "iR-ADVC5560" from Canon Inc. was used as an electrophotographic apparatus. The machine was set so as not to emit any electricity-eliminating light at the time of an image output, and its process cartridge for a black color was mounted with each of the produced electrophotographic photosensitive members. The process cartridge was mounted on the station of the process cartridge for a black color to output an image.

The evaluation was performed under an environment having a temperature of 23° C. and a relative humidity of 50%. First, a full-color image (letter image in which each color had a print percentage of 1%) was output on 5,000 sheets of A4 size plain paper, and then image outputs were continuously performed in the following order: a solid white image was output on 1 sheet thereof; an image for a ghost phenomenon evaluation was output on 5 sheets thereof; a solid black image was output on 1 sheet thereof; and the image for a ghost phenomenon evaluation was output on 5 sheets thereof.

Figure 5:
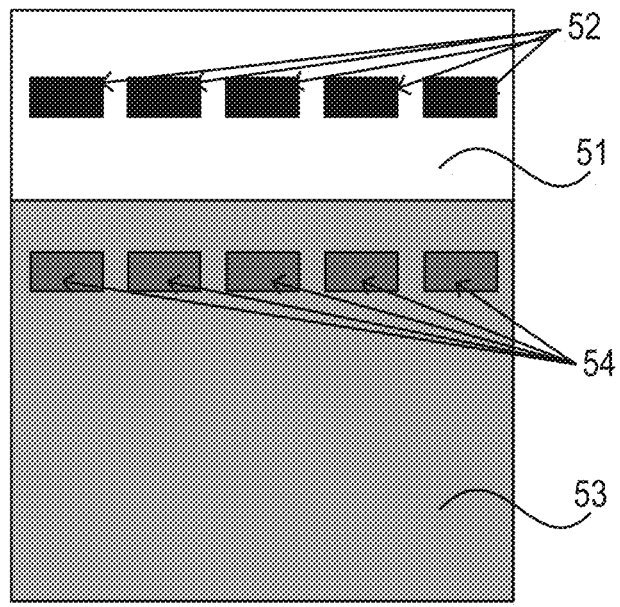
FIG. 5 is a view for illustrating an image for a ghost phenomenon evaluation used in each of Examples.
Figure 6:
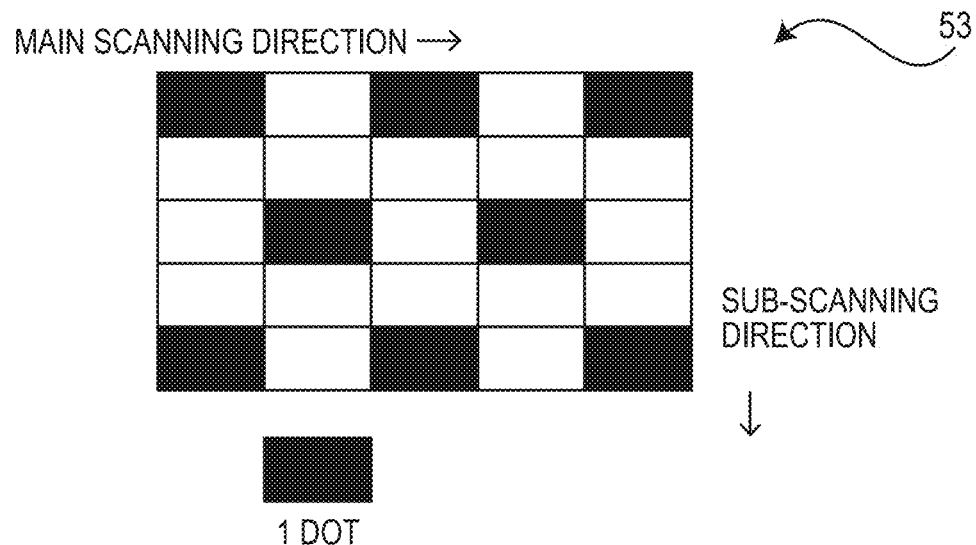
FIG. 6 is a view for illustrating a "one-dot knight-jump pattern halftone image" in FIG. 5.

The image for a ghost phenomenon evaluation is obtained by: outputting quadrangular "solid images 52" in a "white image 51" in an image leading end portion as illustrated in FIG. 5; and then producing a "one-dot knight-jump pattern halftone image 53" illustrated in FIG. 6. In FIG. 5, "ghost portions 54" are portions where ghost phenomena resulting from the "solid images 52" may appear.

A ghost phenomenon evaluation was performed by measuring a density difference between the image density of the one-dot knight-jump pattern halftone image and the image density of each of the ghost portions. The density difference was measured with a spectral densitometer (product name: X-Rite 504/508, manufactured by X-Rite Inc.) at 10 points in 1 image for a ghost phenomenon evaluation. The operation was performed in all the 10 images for ghost phenomenon evaluations, and a Macbeth density difference was evaluated by calculating the average of the values measured at a total of 100 points. The evaluation results are shown in Table 2.

<Evaluation: Evaluation of Fluctuation in Potential at Time of Repeated Use Under Low-Temperature and Low-Humidity Environment>

A fluctuation in potential of a photosensitive member at the time of its repeated use under a low-temperature and low-humidity environment was evaluated by using each of the photosensitive members according to Examples 1 to 28 and Comparative Examples 1 to 12 under the following conditions.

A reconstructed machine of a copying machine available under the product name "iR-ADVC5560" from Canon Inc. was used as an electrophotographic apparatus. A reconstructed point was as follows: the machine was reconstructed so that the potential to which a photosensitive member was charged by a charging roller, and image exposure laser power were able to be regulated. The electrophotographic apparatus and each of the electrophotographic photosensitive members were left at rest under an environment having a temperature of 15° C. and a relative humidity of 10% serving as a low-temperature and low-humidity environment for 48 hours or more, and then the electrophotographic photosensitive member was mounted on the cyan color cartridge of the electrophotographic apparatus.

The surface potential of the electrophotographic photosensitive member was measured by: removing a cartridge for development from the evaluation apparatus; and inserting a potential-measuring device into the position of the cartridge. The potential-measuring device has a configuration in which its potential-measuring probe is arranged at the development position of the cartridge for development. The position of the potential-measuring probe with respect to the electrophotographic photosensitive member was a center in the axial direction of the cylindrical electrophotographic photosensitive member, and the gap thereof from the surface of the electrophotographic photosensitive member was set to 3 mm.

The amplitude and frequency of the AC component of the charging roller were set to 1,500 Vpp and 1,500 Hz, respectively, the initial dark portion potential (VDa) of the electrophotographic photosensitive member was adjusted to −700 V, and the initial light portion potential (VLa) thereof before its endurance in image exposure by laser exposure irradiation was adjusted to −200 V, followed by the recording of the preset values. Those operations were similarly performed in the respective electrophotographic photosensitive members to be evaluated.

1,000 Sheets of paper were continuously passed through the electrophotographic photosensitive member while a strip image having an image density of 1% was printed thereon. Immediately after the completion of the endurance, the light portion potential (VLb) of the photosensitive member after the passing of the 1,000 sheets was measured with the above-mentioned potential-measuring device.

Then, the amount of a fluctuation between the initial light portion potential (VLa) before the paper passing and the light portion potential (VLb) after the paper passing described above was recognized, and the amount was defined as a light portion potential fluctuation $\Delta VL(ab)$. The results are shown in Table 2.

TABLE 1A

| | Hole-transportable compound represented by formula (1) | | Hole-transportable compound represented by formula (2) | | Hole-transportable compound represented by formula (3) | | |
|---|---|---|---|---|---|---|---|
| | No. | W1 (Part(s)) | No. | W2 (Part(s)) | No. | W3 (Part(s)) | W2/W3 |
| Example 1  | 1-3  | 9.90   | 2-3  | 0.08   | 3-3  | 0.02  | 4/1 |
| Example 2  | 1-3  | 9.95   | 2-3  | 0.04   | 3-3  | 0.01  | 4/1 |
| Example 3  | 1-3  | 9.90   | 2-3  | 0.06   | 3-3  | 0.04  | 3/2 |
| Example 4  | 1-3  | 9.99   | 2-3  | 0.01   | —    | 0     | —   |
| Example 5  | 1-3  | 9.97   | 2-3  | 0.03   | —    | 0     | —   |
| Example 6  | 1-3  | 9.90   | 2-3  | 0.10   | —    | 0     | —   |
| Example 7  | 1-3  | 9.80   | 2-3  | 0.20   | —    | 0     | —   |
| Example 8  | 1-3  | 9.50   | 2-3  | 0.50   | —    | 0     | —   |
| Example 9  | 1-3  | 9.90   | 3-3  | 0.10   | —    | 0     | —   |
| Example 10 | 1-1  | 9.95   | 2-1  | 0.04   | 3-1  | 0.01  | 4/1 |
| Example 11 | 1-1  | 9.95   | 2-1  | 0.05   | —    | 0     | —   |
| Example 12 | 1-1  | 9.98   | 2-1  | 0.02   | —    | 0     | —   |
| Example 13 | 1-4  | 9.90   | 2-4  | 0.08   | 3-4  | 0.02  | 4/1 |
| Example 14 | 1-4  | 9.90   | 2-4  | 0.10   | —    | 0     | —   |
| Example 15 | 1-4  | 9.99   | 3-4  | 0.01   | —    | 0     | —   |
| Example 16 | 1-5  | 9.90   | 2-5  | 0.10   | —    | 0     | —   |
| Example 17 | 1-7  | 9.95   | 2-7  | 0.04   | 3-3  | 0.01  | 4/1 |
| Example 18 | 1-12 | 7.425  | 2-12 | 0.06   | 3-12 | 0.015 | 4/1 |
| Example 19 | 1-12 | 7.425  | 2-12 | 0.075  | —    | 0     | —   |
| Example 20 | 1-12 | 7.4775 | 2-12 | 0.0225 | —    | 0     | —   |
| Example 21 | 1-12 | 7.425  | —    | 0      | 3-12 | 0.075 | —   |
| Example 22 | 1-11 | 7.425  | 2-11 | 0.06   | 3-11 | 0.015 | 4/1 |
| Example 23 | 1-11 | 7.425  | 2-11 | 0.075  | —    | 0     | —   |
| Example 24 | 1-11 | 7.425  | —    | 0      | 3-11 | 0.075 | —   |
| Example 25 | 1-15 | 7.425  | 2-15 | 0.075  | —    | 0     | —   |
| Example 26 | 1-15 | 7.425  | —    | 0      | 3-15 | 0.075 | —   |
| Example 27 | 1-16 | 7.425  | 2-16 | 0.075  | —    | 0     | —   |
| Example 28 | 1-3  | 6.93   | 2-3  | 0.056  | 3-3  | 0.014 | 4/1 |
|            | 1-12 | 2.97   | 2-12 | 0.024  | 3-12 | 0.006 | 4/1 |

TABLE 1B

| | Hole-transportable compound represented by formula (1) | | Hole-transportable compound represented by formula (2) | | Hole-transportable compound represented by formula (3) | | |
|---|---|---|---|---|---|---|---|
| | No. | W1 (Part(s)) | No. | W2 (Part(s)) | No. | W3 (Part(s)) | W2/W3 |
| Comparative Example 1  | 1-3  | 10.0   | —    | —      | — | — | — |
| Comparative Example 2  | 1-3  | 9.90   | 2-3  | 0.10   | — | — | — |
| Comparative Example 3  | 1-1  | 10.0   | —    | —      | — | — | — |
| Comparative Example 4  | 1-1  | 9.90   | 2-1  | 0.10   | — | — | — |
| Comparative Example 5  | 1-4  | 10.0   | —    | —      | — | — | — |
| Comparative Example 6  | 1-4  | 9.90   | 2-4  | 0.10   | — | — | — |
| Comparative Example 7  | 1-12 | 7.50   | —    | —      | — | — | — |
| Comparative Example 8  | 1-12 | 7.0125 | 2-12 | 0.4875 | — | — | — |
| Comparative Example 9  | 1-11 | 7.50   | —    | —      | — | — | — |
| Comparative Example 10 | 1-11 | 7.0125 | 2-11 | 0.4875 | — | — | — |
| Comparative Example 11 | 1-15 | 7.50   | —    | —      | — | — | — |
| Comparative Example 12 | 1-15 | 7.0125 | 2-15 | 0.4875 | — | — | — |

TABLE 2A

|  | Calculated value of HOMO energy of hole-transportable compound represented by formula (1) (eV) | Calculated value of HOMO energy of hole-transportable compounds represented by formula (2) and formula (3) (eV) | \|CTM2HOMO\| − \|CTM1HOMO\| (eV) | Addition mass ratio of hole-transportable compounds represented by formula (2) and formula (3) (W2 + W3)/(W1 + W2 + W3) | Evaluation results of photosensitive member Ghost image evaluation [average of density differences] | Fluctuation in potential under low-humidity environment (V) |
|---|---|---|---|---|---|---|
| Example 1 | 4.98 | 5.16 | 0.18 | 1.0% | 0.024 | 5 |
| Example 2 | 4.98 | 5.16 | 0.18 | 0.5% | 0.024 | 5 |
| Example 3 | 4.98 | 5.13 | 0.15 | 1.0% | 0.025 | 4 |
| Example 4 | 4.98 | 5.19 | 0.21 | 0.1% | 0.040 | 4 |
| Example 5 | 4.98 | 5.19 | 0.21 | 0.3% | 0.033 | 5 |
| Example 6 | 4.98 | 5.19 | 0.21 | 1.0% | 0.024 | 7 |
| Example 7 | 4.98 | 5.19 | 0.21 | 2.0% | 0.022 | 9 |
| Example 8 | 4.98 | 5.19 | 0.21 | 5.0% | 0.027 | 11 |
| Example 9 | 4.98 | 5.03 | 0.05 | 1.0% | 0.038 | 11 |
| Example 10 | 4.98 | 5.16 | 0.18 | 1.0% | 0.025 | 5 |
| Example 11 | 4.98 | 5.18 | 0.20 | 0.5% | 0.028 | 6 |
| Example 12 | 4.98 | 5.18 | 0.20 | 0.2% | 0.039 | 5 |
| Example 13 | 4.93 | 5.07 | 0.14 | 1.0% | 0.031 | 7 |
| Example 14 | 4.93 | 5.08 | 0.15 | 1.0% | 0.025 | 7 |
| Example 15 | 4.93 | 5.01 | 0.08 | 0.1% | 0.048 | 10 |
| Example 16 | 4.89 | 5.06 | 0.17 | 1.0% | 0.039 | 12 |
| Example 17 | 5.03 | 5.14 | 0.11 | 0.5% | 0.033 | 9 |
| Example 18 | 4.90 | 5.07 | 0.17 | 1.0% | 0.026 | 6 |
| Example 19 | 4.90 | 5.08 | 0.18 | 1.0% | 0.025 | 7 |
| Example 20 | 4.90 | 5.08 | 0.18 | 0.3% | 0.032 | 5 |
| Example 21 | 4.90 | 5.03 | 0.13 | 1.0% | 0.035 | 7 |
| Example 22 | 4.90 | 5.07 | 0.17 | 1.0% | 0.031 | 8 |
| Example 23 | 4.90 | 5.08 | 0.18 | 1.0% | 0.030 | 8 |
| Example 24 | 4.90 | 5.02 | 0.12 | 1.0% | 0.036 | 8 |
| Example 25 | 4.91 | 5.05 | 0.14 | 1.0% | 0.034 | 7 |
| Example 26 | 4.91 | 4.98 | 0.07 | 1.0% | 0.045 | 8 |
| Example 27 | 4.93 | 5.04 | 0.11 | 1.0% | 0.038 | 12 |
| Example 28 | 4.96 | 5.14 | 0.18 | 1.0% | 0.025 | 6 |

TABLE 2B

|  | Calculated value of HOMO energy of hole-transportable compound represented by formula (1) (eV) | Calculated value of HOMO energy of hole-transportable compounds represented by formula (2) and formula (3) (eV) | \|CTM2HOMO\| − \|CTM1HOMO\| (eV) | Addition mass ratio of hole-transportable compounds represented by formula (2) and formula (3) (W2 + W3)/(W1 + W2 + W3) | Evaluation results of photosensitive member Ghost image evaluation [average of density differences] | Fluctuation in potential under low-humidity environment (V) |
|---|---|---|---|---|---|---|
| Comparative Example 1 | 4.98 | — | — | 0% | 0.067 | 5 |
| Comparative Example 2 | 4.98 | 5.19 | 0.21 | 6.5% | 0.044 | 22 |
| Comparative Example 3 | 4.98 | — | — | 0% | 0.070 | 4 |
| Comparative Example 4 | 4.98 | 5.18 | 0.20 | 6.5% | 0.042 | 18 |
| Comparative Example 5 | 4.93 | — | — | 0% | 0.071 | 6 |
| Comparative Example 6 | 4.93 | 5.08 | 0.15 | 6.5% | 0.040 | 20 |
| Comparative Example 7 | 4.90 | — | — | 0% | 0.058 | 7 |
| Comparative Example 8 | 4.90 | 5.08 | 0.18 | 6.5% | 0.044 | 19 |
| Comparative Example 9 | 4.90 | — | — | 0% | 0.063 | 6 |
| Comparative Example 10 | 4.90 | 5.08 | 0.18 | 6.5% | 0.045 | 21 |

TABLE 2B-continued

|  | Calculated value of HOMO energy of hole-transportable compound represented by formula (1) (eV) | Calculated value of HOMO energy of hole-transportable compounds represented by formula (2) and formula (3) (eV) | \|CTM2HOMO\| − \|CTM1HOMO\| (eV) | Addition mass ratio of hole-transportable compounds represented by formula (2) and formula (3) (W2 + W3)/ (W1 + W2 + W3) | Evaluation results of photosensitive member | |
|---|---|---|---|---|---|---|
|  |  |  |  |  | Ghost image evaluation [average of density differences] | Fluctuation in potential under low-humidity environment (V) |
| Comparative Example 11 | 4.91 | — | — | 0% | 0.068 | 8 |
| Comparative Example 12 | 4.91 | 5.05 | 0.14 | 6.5% | 0.055 | 25 |

As described above, according to the present invention, there can be provided the electrophotographic photosensitive member, which has a ghost phenomenon-suppressing effect, has satisfactory durability, and is excellent in electrical characteristics, and the electrophotographic apparatus and the process cartridge each including the electrophotographic photosensitive member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-177593, filed Oct. 29, 2021, which is hereby incorporated by reference herein in its entirety.

What is claimed is:

1. An electrophotographic photosensitive member, comprising:

a support;

a charge-generating layer formed on the support;

a first hole-transporting layer formed on the charge-generating layer; and a second hole-transporting layer formed on the first hole-transporting layer, the second hole-transporting layer being a surface layer and comprising a copolymer of a composition containing hole-transportable compounds represented by formulae (1) and (3), and optionally comprising a hole-transportable compound represented by formula (2)

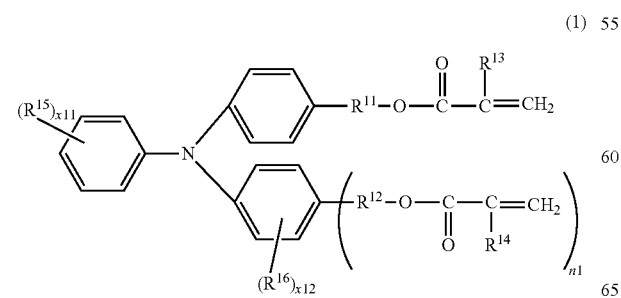

(1)

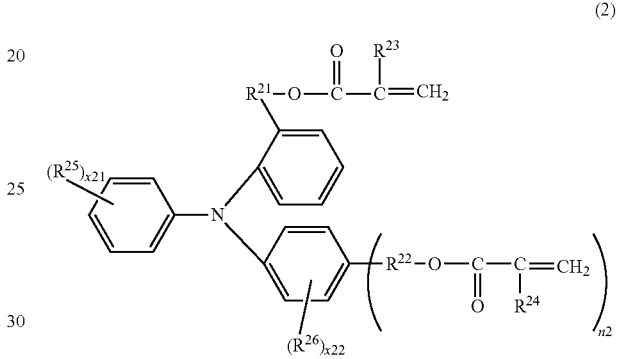

(2)

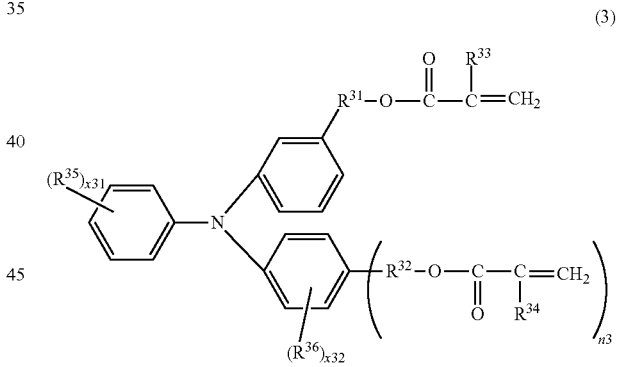

(3)

where $R^{11}$ and $R^{12}$ independently represent an alkylene group having 2 to 6 carbon atoms, $R^{13}$ and $R^{14}$ independently represent a hydrogen atom or a methyl group, $n^1$ represents 1, $R^{15}$ represents an alkyl group having 1 to 4 carbon atoms, an alkoxy group having 1 to 4 carbon atoms or a substituted or unsubstituted phenyl group, $x^{11}$ represents an integer of from 0 to 5 and when $x^{11}$ represents an integer of from 2 to 5, $R^{15}$s may be identical to or different from each other, $R^{16}$ represents an alkyl group having 1 to 4 carbon atoms, or an alkoxy group having 1 to 4 carbon atoms, $x^{12}$ represents an integer of from 0 to 4 and when $x^{12}$ represents an integer of from 2 to 4, $R^{16}$s may be identical to or different from each other, $R^{21}$ and $R^{22}$ independently represent an alkylene group having 2 to 6 carbon atoms, $R^{23}$ and $R^{24}$ independently represent a hydrogen atom or a methyl group, $n^2$ represents 1, $R^{25}$ represents an alkyl group having 1 to 4 carbon atoms, an alkoxy group having 1 to 4 carbon atoms or a substituted or unsubstituted phenyl group, $x^{21}$ represents an integer of from 0 to 5, and when $x^{21}$ represents an integer of from 2 to 5, $R^{25}$s may be identical to or different from each other, $R^{26}$ represents an alkyl group having 1 to 4 carbon atoms, or an alkoxy group having 1 to 4 carbon atoms, $x^{22}$ represents an integer of from 0 to 4 and when $x^{22}$ represents an integer of from 2 to 4, $R^{26}$s may be identical to or different from each other, $R^{31}$ and $R^{32}$ independently represent an alkylene group having 2 to 6 carbon atoms, $R^{33}$ and $R^{34}$ independently represent a hydrogen atom or a methyl group, $n^3$ represents 1, $R^{35}$ represents an alkyl group having 1 to 4 carbon atoms, an alkoxy group having 1 to 4 carbon atoms, or a substituted or unsubstituted phenyl group, $x^{31}$ represents an integer of from 0 to 5 and when $x^{31}$ represents an integer of from 2 to 5, $R^{35}$s may be identical to or different from each other, $R^{36}$ represents an alkyl group having 1 to 4 carbon atoms or an alkoxy group having 1 to 4 carbon atoms, and $x^{32}$ represents an integer of from 0 to 4 and when $x^{32}$ represents an integer of from 2 to 4, $R^{36}$s may be identical to or different from each other, wherein $(W2+W3)/(W1+W2+W3)\times100$ (% by mass) is 0.05 to 5.0% by mass when W1 is a mass of the hole-transportable compound represented by formula (1) in the composition, W2 is a mass of the hole-transportable compound represented by formula (2) in the composition, and W3 is a mass of the hole-transportable compound represented by formula (3) in the composition, and 0.05 (eV)≤|CTM2HOMO|−|CTM1HOMO|≤0.30 (eV)

when CTM1HOMO is an energy value of a highest occupied molecular orbital of the hole-transportable compound represented by formula (1) obtained as a result of energy calculation of the hole-transportable compound after structure optimization thereof by a density functional theory B3LYP/6-31G*, and CTM2HOMO is an energy value of a highest occupied molecular orbital of the hole-transportable compound represented by formula (3) obtained as a result of energy calculation of the hole-transportable compound after structure optimization thereof by the density functional theory B3LYP/6-31G*.

2. The electrophotographic photosensitive member according to claim 1, wherein 0.15 (eV)≤|CTM2HOMO|−|CTM1HOMO|≤0.25 (eV).

3. The electrophotographic photosensitive member according to claim 1, wherein $(W2+W3)/(W1+W2+W3)\times100$ (% by mass) is 0.1 to 2.0% by mass.

4. The electrophotographic photosensitive member according to claim 3, wherein $(W2+W3)/(W1+W2+W3)\times100$ (% by mass) is 0.2 to 1.0% by mass.

5. An electrophotographic apparatus, comprising:
an electrophotographic photosensitive member;
a charging unit;
an exposing unit;
a developing unit; and
a transferring unit;
the electrophotographic photosensitive member comprising a support, a charge-generating layer formed on the support, a first hole-transporting layer formed on the charge-generating layer, and a second hole-transporting layer formed on the first hole-transporting layer, the second hole-transporting layer being a surface layer of the electrophotographic photosensitive member and comprising a copolymer of a composition containing hole-transportable compounds represented by formulae (1) and (3), and optionally comprising at a hole-transportable compound represented by formula (2)

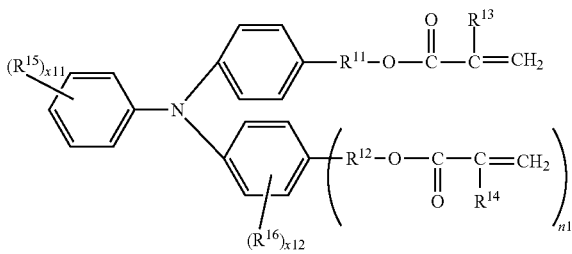

(1)

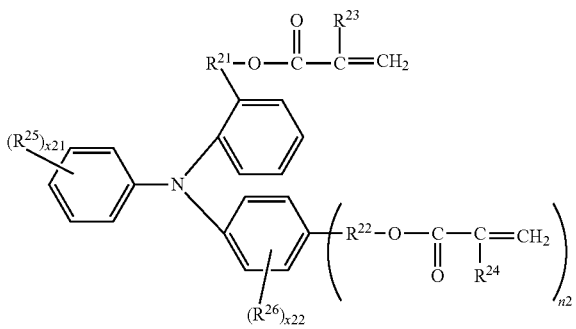

(2)

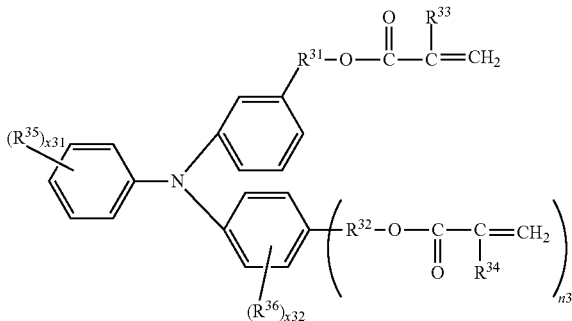

(3)

where $R^{11}$ and $R^{12}$ independently represent an alkylene group having 2 to 6 carbon atoms, $R^{13}$ and $R^{14}$ independently represent a hydrogen atom or a methyl group, $n^1$ represents 1, $R^{15}$ represents an alkyl group having 1 to 4 carbon atoms, an alkoxy group having 1 to 4 carbon atoms or a substituted or unsubstituted phenyl group, $x^{11}$ represents an integer of from 0 to 5 and when $x^{11}$ represents an integer of from 2 to 5, $R^{15}$s may be identical to or different from each other, $R^{16}$ represents an alkyl group having 1 to 4 carbon atoms, or an alkoxy group having 1 to 4 carbon atoms, $x^{12}$ represents an integer of from 0 to 4 and when $x^{12}$ represents an integer of from 2 to 4, $R^{16}$s may be identical to or different from each other, $R^{21}$ and $R^{22}$ independently represent an alkylene group having 2 to 6 carbon atoms, $R^{23}$ and $R^{24}$ independently represent a hydrogen atom or a methyl group, $n^2$ represents 1, $R^{25}$ represents an alkyl group having 1 to 4 carbon atoms, an alkoxy group having 1 to 4 carbon atoms or a substituted or unsubstituted phenyl group, $x^{21}$ represents an integer of from 0 to 5, and when $x^{21}$ represents an integer of from 2 to 5, $R^{25}$s may be identical to or different from each other, $R^{26}$ represents an alkyl group having 1 to 4 carbon atoms, or an alkoxy group having 1 to 4 carbon atoms, $x^{22}$ represents an integer of from 0 to 4 and when $x^{22}$ represents an integer of from 2 to 4, $R^{26}$s may be identical to or different from each other, $R^{31}$ and $R^{32}$ independently represent an alkylene group having 2 to 6 carbon atoms, $R^{33}$ and $R^{34}$ independently represent a hydrogen atom or a methyl group, $n^3$ represents 1, $R^{35}$ represents an alkyl group having 1 to 4 carbon atoms, an alkoxy group having 1 to 4 carbon atoms, or a substituted or unsubstituted phenyl group, $x^{31}$ represents an integer of from 0 to 5 and when $x^{31}$ represents an integer of from 2 to 5, $R^{35}$s may be identical to or different from each other, $R^{36}$ represents an alkyl group having 1 to 4 carbon atoms or an alkoxy group having 1 to 4 carbon atoms, and $x^{32}$ represents an integer of from 0 to 4 and when $x^{32}$ represents an integer of from 2 to 4, $R^{36}$s may be identical to or different from each other, wherein $(W2+W3)/(W1+W2+W3) \times 100$ (% by mass) is 0.05 to 5.0% by mass when W1 is a mass of the hole-transportable compound represented by formula (1) in the composition, W2 is a mass of the hole-transportable compound represented by formula (2) in the composition, and W3 is a mass of the hole-transportable compound represented by formula (3) in the composition, and 0.05 (eV)≤|CTM2HOMO|−|CTM1HOMO|≤0.30 (eV)

when CTM1HOMO is an energy value of a highest occupied molecular orbital of the hole-transportable compound represented by formula (1) obtained as a result of energy calculation of the hole-transportable compound after structure optimization thereof by a density functional theory B3LYP/6-31G*, and CTM2HOMO is an energy value of a highest occupied molecular orbital of the hole-transportable compound represented by formula (3) obtained as a result of energy calculation of the hole-transportable compound after structure optimization thereof by the density functional theory B3LYP/6-31G*.

6. A process cartridge, comprising:

an electrophotographic photosensitive member; and at least one unit selected from the group consisting of a charging unit, a developing unit, a transferring unit and a cleaning unit, the process cartridge integrally supporting the electrophotographic photosensitive member and the at least one unit, and being removably mounted onto a main body of an electrophotographic apparatus;

the electrophotographic photosensitive member comprising a support, a charge-generating layer formed on the support, a first hole-transporting layer formed on the charge-generating layer, and a second hole-transporting layer formed on the first hole-transporting layer, the second hole-transporting layer being a surface layer of the electrophotographic photosensitive member and comprising a copolymer of a composition containing hole-transportable compounds represented by formulae (1) and (3), and optionally comprising a hole-transportable compound represented by formula (2)

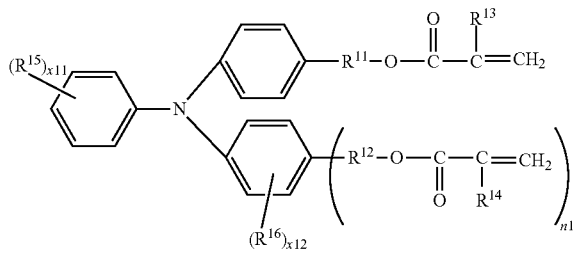

(1)

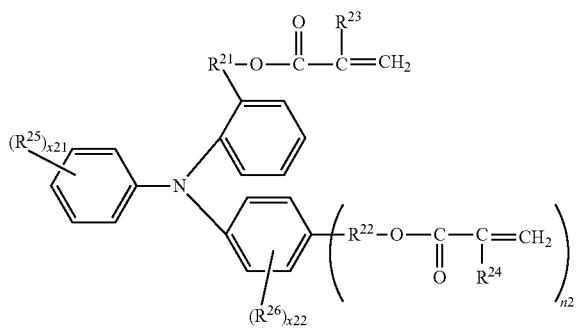

(2)

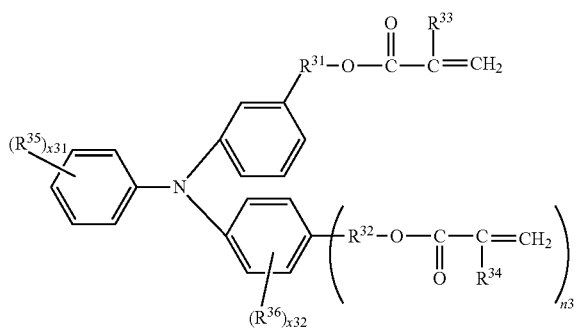

(3)

where $R^{11}$ and $R^{12}$ independently represent an alkylene group having 2 to 6 carbon atoms, $R^{13}$ and $R^{14}$ independently represent a hydrogen atom or a methyl group, $n^1$ represents 1, $R^{15}$ represents an alkyl group having 1 to 4 carbon atoms, an alkoxy group having 1 to 4 carbon atoms or a substituted or unsubstituted phenyl group, $x^{11}$ represents an integer of from 0 to 5 and when $x^{11}$ represents an integer of from 2 to 5, $R^{15}$s may be identical to or different from each other, $R^{16}$ represents an alkyl group having 1 to 4 carbon atoms, or an alkoxy group having 1 to 4 carbon atoms, $x^{12}$ represents an integer of from 0 to 4 and when $x^{12}$ represents an integer of from 2 to 4, $R^{16}$s may be identical to or different from each other, $R^{21}$ and $R^{22}$ independently represent an alkylene group having 2 to 6 carbon atoms, $R^{23}$ and $R^{24}$ independently represent a hydrogen atom or a methyl group, $n^2$ represents 1, $R^{25}$ represents an alkyl group having 1 to 4 carbon atoms, an alkoxy group having 1 to 4 carbon atoms or a substituted or unsubstituted phenyl group, $x^{21}$ represents an integer of from 0 to 5, and when $x^{21}$ represents an integer of from 2 to 5, $R^{25}$s may be identical to or different from each other, $R^{26}$ represents an alkyl group having 1 to 4 carbon atoms, or an alkoxy group having 1 to 4 carbon atoms, $x^{22}$ represents an integer of from 0 to 4 and when $x^{22}$ represents an integer of from 2 to 4, $R^{26}$s may be identical to or different from each other, $R^{31}$ and $R^{32}$ independently represent an alkylene group having 2 to 6 carbon atoms, $R^{33}$ and $R^{34}$ independently represent a hydrogen atom or a methyl group, $n^3$ represents 1, $R^{35}$ represents an alkyl group having 1 to 4 carbon atoms, an alkoxy group having 1 to 4 carbon atoms, or a substituted or unsubstituted phenyl group, $x^{31}$ represents an integer of from 0 to 5 and when $x^{31}$ represents an integer of from 2 to 5, $R^{35}$s may be identical to or different from each other, $R^{36}$ represents an alkyl group having 1 to 4 carbon atoms or an alkoxy group having 1 to 4 carbon atoms, and $x^{32}$ represents an integer of from 0 to 4 and when $x^{32}$ represents an integer of from 2 to 4, $R^{36}$s may be identical to or different from each other, wherein $(W2+W3)/(W1+W2+W3) \times 100$ (% by mass) is 0.05 to 5.0% by mass when W1 is a mass of the hole-transportable compound represented by formula (1) in the composition, W2 is a mass of the hole-transportable compound represented by formula (2) in the composition, and W3 is a mass of the hole-transportable compound represented by formula (3) in the composition, and 0.05 (eV)≤|CTM2HOMO|−|CTM1HOMO|≤0.30 (eV)

when CTM1HOMO is an energy value of a highest occupied molecular orbital of the hole-transportable compound represented by formula (1) obtained as a result of energy calculation of the hole-transportable compound after structure optimization thereof by a density functional theory B3LYP/6-31G*, and CTM2HOMO is an energy value of a highest occupied molecular orbital of the hole-transportable compound represented by formula (3) obtained as a result of energy calculation of the hole-transportable compound after structure optimization thereof by the density functional theory B3LYP/6-31G*.

7. A method of producing an electrophotographic photosensitive member including a support, a charge-generating layer formed on the support, a first hole-transporting layer formed on the charge-generating layer, and a second hole-transporting layer formed on the first hole-transporting layer, the second hole-transporting layer being a surface layer, the method comprising:

forming a coat of an application liquid for the second hole-transporting layer containing hole-transportable compounds represented by formulae (1) and (3), and optionally comprising a hole-transportable compound represented by formula (2); and copolymerizing a composition incorporated into the coat to form the second hole-transporting layer of the electrophotographic photosensitive member

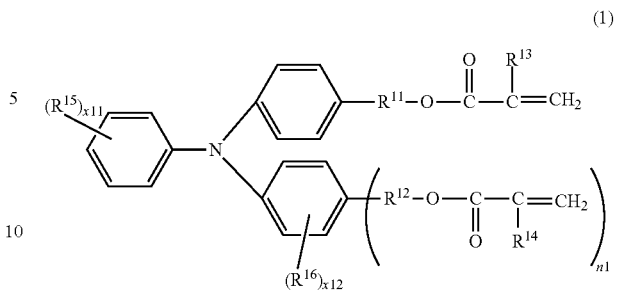

(1)

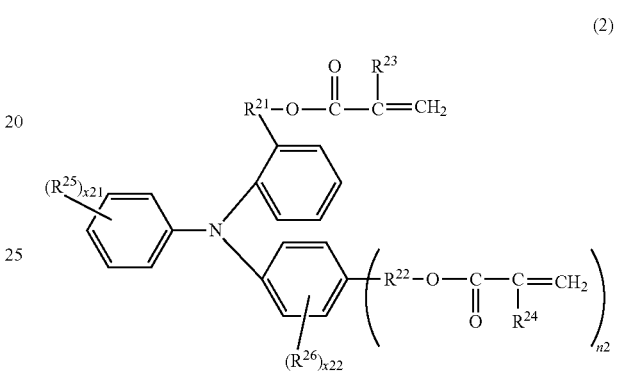

(2)

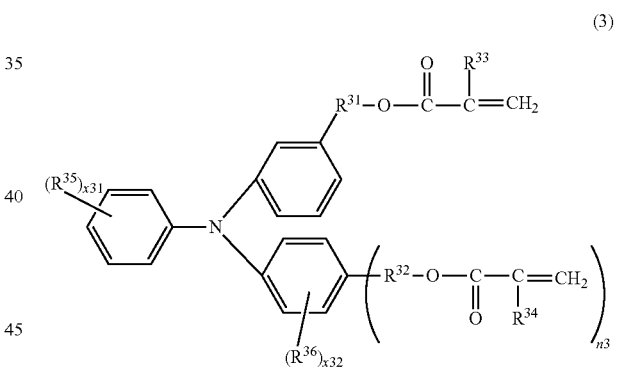

(3)

where $R^{11}$ and $R^{12}$ independently represent an alkylene group having 2 to 6 carbon atoms, $R^{13}$ and $R^{14}$ independently represent a hydrogen atom or a methyl group, $n^1$ represents 1, $R^{15}$ represents an alkyl group having 1 to 4 carbon atoms, an alkoxy group having 1 to 4 carbon atoms or a substituted or unsubstituted phenyl group, $x^{11}$ represents an integer of from 0 to 5 and when $x^{11}$ represents an integer of from 2 to 5, $R^{15}$s may be identical to or different from each other, $R^{16}$ represents an alkyl group having 1 to 4 carbon atoms, or an alkoxy group having 1 to 4 carbon atoms, $x^{12}$ represents an integer of from 0 to 4 and when $x^{12}$ represents an integer of from 2 to 4, $R^{16}$s may be identical to or different from each other, $R^{21}$ and $R^{22}$ independently represent an alkylene group having 2 to 6 carbon atoms, $R^{23}$ and $R^{24}$ independently represent a hydrogen atom or a methyl group, $n^2$ represents 1, $R^{25}$ represents an alkyl group having 1 to 4 carbon atoms, an alkoxy group having 1 to 4 carbon atoms or a substituted or unsubstituted phenyl group, $x^{21}$ represents an integer of from 0 to 5, and when $x^{21}$ represents an integer of from 2 to 5, $R^{25}$s may be identical to or different from each other, $R^{26}$ represents an alkyl group having 1 to 4 carbon atoms, or an alkoxy group having 1 to 4 carbon atoms, $x^{22}$ represents an integer of from 0 to 4 and when $x^{22}$ represents an integer of from 2 to 4, $R^{26}$s may be identical to or different from each other, $R^{31}$ and $R^{32}$ independently represent an alkylene group having 2 to 6 carbon atoms, $R^{33}$ and $R^{34}$ independently represent a hydrogen atom or a methyl group, $n^3$ represents 1, $R^{35}$ represents an alkyl group having 1 to 4 carbon atoms, an alkoxy group having 1 to 4 carbon atoms, or a substituted or unsubstituted phenyl group, $x^{31}$ represents an integer of from 0 to 5 and when $x^{31}$ represents an integer of from 2 to 5, $R^{35}$s may be identical to or different from each other, $R^{36}$ represents an alkyl group having 1 to 4 carbon atoms or an alkoxy group having 1 to 4 carbon atoms, and $x^{32}$ represents an integer of from 0 to 4 and when $x^{32}$ represents an integer of from 2 to 4, $R^{36}$s may be identical to or different from each other, wherein $(W2+W3)/(W1+W2+W3) \times 100$ (% by mass) is 0.05 to 5.0% by mass when W1 is a mass of the hole-transportable compound represented by formula (1) that is incorporated into the application liquid for the second hole-transporting layer, W2 is a mass of the hole-transportable compound represented by formula (2) that is incorporated into the application liquid for the second hole-transporting layer, and W3 is a mass of the hole-transportable compound represented by formula (3) that is incorporated into the application liquid for the second hole-transporting layer, and $0.05$ (eV) $\leq |\text{CTM2HOMO}| - |\text{CTM1HOMO}| \leq 0.30$ (eV)

when CTM1HOMO is an energy value of a highest occupied molecular orbital of the hole-transportable compound represented by formula (1) obtained as a result of energy calculation of the hole-transportable compound after structure optimization thereof by a density functional theory B3LYP/6-31G*, and CTM2HOMO is an energy value of a highest occupied molecular orbital of the hole-transportable compound represented by formula (3) obtained as a result of energy calculation of the hole-transportable compound after structure optimization thereof by the density functional theory B3LYP/6-31G*.

8. The electrophotographic photosensitive member according to claim 1, wherein the second hole-transportable layer comprises the hole-transportable compound according to formula (2).

9. The electrophotographic apparatus according to claim 5, wherein the second hole-transportable layer comprises the hole-transportable compound according to formula (2).

10. The process cartridge according to claim 6, wherein the second hole-transportable layer comprises the hole-transportable compound according to formula (2).

11. The method of producing an electrophotographic photosensitive member according to claim 7, wherein the second hole-transportable layer comprises the hole-transportable compound according to formula (2).

* * * * *